US012079787B2

(12) United States Patent
Lisagor et al.

(10) Patent No.: US 12,079,787 B2
(45) Date of Patent: Sep. 3, 2024

(54) GENERATING TRANSACTION VECTORS FOR FACILITATING NETWORK TRANSACTIONS

(71) Applicant: Chime Financial, Inc., San Francisco, CA (US)

(72) Inventors: Roman Lisagor, Vancouver (CA); Praveen Jain, San Mateo, CA (US); Fletcher Fowler, Portsmouth, NH (US)

(73) Assignee: Chime Financial, Inc., San Francisco, CA (US)

( * ) Notice: Subject to any disclaimer, the term of this patent is extended or adjusted under 35 U.S.C. 154(b) by 13 days.

(21) Appl. No.: 17/821,992

(22) Filed: Aug. 24, 2022

(65) Prior Publication Data
US 2024/0070628 A1    Feb. 29, 2024

(51) Int. Cl.
*G06Q 40/00*     (2023.01)
*G06Q 20/10*     (2012.01)
*G06Q 20/40*     (2012.01)

(52) U.S. Cl.
CPC ............. *G06Q 20/10* (2013.01); *G06Q 20/40* (2013.01)

(58) Field of Classification Search
CPC ............................... G06Q 20/10; G06Q 20/40
See application file for complete search history.

(56) References Cited

U.S. PATENT DOCUMENTS

| 2021/0226921 A1* | 7/2021 | Rose | H04L 63/0272 |
| 2021/0389854 A1* | 12/2021 | Rose | G06F 3/0482 |
| 2023/0045774 A9* | 2/2023 | Gunther | G06Q 50/18 |

OTHER PUBLICATIONS

Cao J. ((2019) Improved support vector machine classification algorithm based on adaptive feature weight updating in the Hadoop cluster environment. PLoS One 14(4): e0215136. https://doi.org/10.1371/ journal.pone.0215136) (Year: 2019).*

* cited by examiner

*Primary Examiner* — Elizabeth H Rosen
*Assistant Examiner* — Mark H Gaw
(74) *Attorney, Agent, or Firm* — Keller Preece PLLC

(57) ABSTRACT

This disclosure describes a vector configurator system that, as part of an inter-network facilitation system, can generate and utilize transaction vectors for facilitating network transactions among digital accounts of an inter-network facilitation system. For example, the disclosed systems can generate a transaction vector that includes a unique set of key attributes defining parameters for a network transaction and that further includes a ledger specification indicating computer code for how to execute the network transaction. Upon receiving a transaction request, the disclosed systems can access a repository of transaction vectors to determine whether a corresponding vector exists for the request. The disclosed systems can either validate or reject the transaction request based on the existence or nonexistence of a transaction vector for the request. The disclosed systems can further execute or process a network transaction for the request according to a stored transaction vector corresponding to the request.

20 Claims, 9 Drawing Sheets

GENERATING TRANSACTION VECTORS FOR FACILITATING NETWORK TRANSACTIONS

BACKGROUND

Recent years have seen significant developments in systems that utilize distributed computing resources to process large data volumes in managing digital accounts and transmitting digital communications across computer networks. For example, conventional systems utilize a variety of computing devices to manage and track digital payloads across network components and internet-based systems. To illustrate, conventional systems utilize various computer algorithms to manage digital payloads for dictating network transactions or data movement between digital accounts. Although conventional systems utilize various computer-implemented algorithms to generate and manage digital accounts and digital payloads, conventional systems nevertheless suffer from a number of technical deficiencies, particularly with regard to computer efficiency and flexibility.

As just suggested, some existing networking systems are inefficient. In particular, some prior networking systems waste computer storage resources by storing separate computer code or transaction data for each network transaction independently. Indeed, many existing systems store computer code defining each separate network transaction as its own data entry within a computer database. As networks grow larger and as more network transactions occur across increasing numbers of accounts within these prior systems, the storage requirements for maintaining the data for network transaction across such growing numbers of accounts likewise expand. By storing such large amounts of information, these conventional systems require substantial computer database capacity that might otherwise be reduced with a more efficient system.

As another example of their inefficiency, some prior network systems require significant computer processing power to execute network transactions. To elaborate, upon detecting a request for a network transaction (e.g., to move digital assets across accounts), existing systems often process the transaction by communicating across large numbers of internal network components and/or external internet-based systems. Indeed, because existing systems often receive cryptic transaction requests that include large amounts of superfluous data specific to the requesting platform (and sometimes do not include data tying the request to particular asset flows), these existing systems need to interpret or translate the transaction requests for compatibility and further need to separately access asset flows for the requests. Over large numbers of transaction requests, this process of redefining a transaction pipeline for each request—by translating every transaction request and dedicating resources to separately determine relevant accounts/ assets for the request-becomes computationally expensive, especially in cases where transactions occur frequently and/or for large numbers of accounts. Thus, many conventional systems waste computer processing power that could be preserved with a more efficient system.

These inefficiencies not only lead to increased computer resource utilization but undermine the flexibility and functionality of implementing computing devices. Processing each transaction request to independently define the pipeline for accounts and asset flows limits the adaptability of existing systems. For example, existing systems rigidly and painstakingly redefine the transaction data for each individual transaction request, incapable of adapting to different requests or transactions more flexibly. Additionally, rigid adherence to this inefficient request processing introduces latency (resulting from its computationally intensive nature) that ties up the resources of computing devices and prevents them from performing other functions.

These, along with additional problems and issues, exist with conventional networking systems.

SUMMARY

This disclosure describes one or more embodiments of methods, non-transitory computer-readable media, and systems that can solve the foregoing problems in addition to providing other benefits. Particularly, the disclosed systems can improve efficiency and flexibility by generating and utilizing transaction vectors to define and facilitate valid network transactions among digital accounts of an inter-network facilitation system. For example, the disclosed systems can generate a transaction vector that includes a set of key transaction attributes of a network transaction and that further includes a ledger specification indicating computer code for moving assets between digital accounts. Such key transaction attributes may include, for instance, an account type for a user account associated with the network transaction or a movement trigger classification indicating a reason for the network transaction. Upon receiving a transaction request, the disclosed systems can access a repository of transaction vectors to determine whether a corresponding vector exists (or is stored in the repository) for the request. The disclosed systems can either validate or reject the transaction request based on the existence or nonexistence of a transaction vector for the request. The disclosed systems can further execute or process a network transaction for the request according to a stored transaction vector corresponding to the request.

BRIEF DESCRIPTION OF THE DRAWINGS

The detailed description refers to the drawings briefly described below.

DETAILED DESCRIPTION

Figure 1:
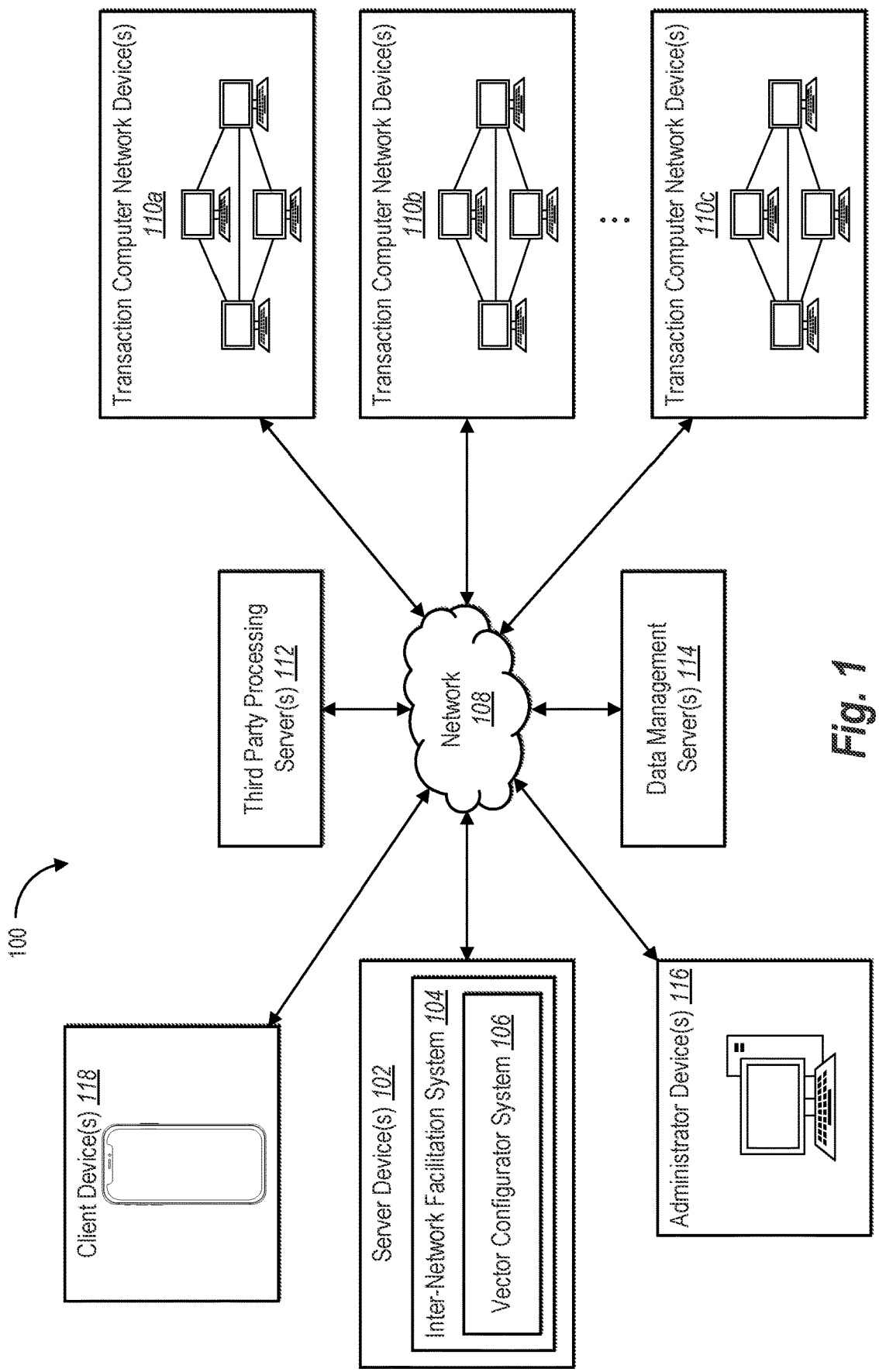
FIG. 1 illustrates a block diagram of an environment for implementing an inter-network facilitation system and a vector configurator system in accordance with one or more embodiments.

This disclosure describes a vector configurator system that can efficiently and flexibly generate and utilize transaction vectors to define (types of) network transactions for moving assets among digital accounts of an inter-network facilitation system. In some situations, network-based systems pass information among multiple servers hosting multiple compartmentalized components, modules, or services (with shared or independent processor(s)) to perform respective functions, where different network components generate and receive different data to perform their respective functions as part of the overarching ecosystem. For instance, in response to a request from a network component (or a third-party system) to perform a network transaction to move assets (among accounts within an inter-network facilitation system or between an account and a third party system), the vector configurator system can use multiple network components and data constructs to generate and pass the requested data/assets safely and securely: 1) a transaction network component that ingests the request and identifies transaction attributes from the request, 2) a journal network component that queries a transaction vector repository to determine whether a vector exists (and is enabled) that corresponds to the request and that further publishes events for network transactions to an event stream, a 3) program configurator component that maintains the transaction vector repository of transaction vectors defining valid (types of) transactions executable by the inter-network facilitation system and further defining how to execute the transactions, and 4) a ledger network component that consumes an event (including a transaction vector) published by the journal network component and that facilitates execution of the transaction as dictated by the transaction vector.

As just mentioned, the vector configurator system can generate and store transaction vectors within a transaction vector repository. To elaborate, the vector configurator system can generate a unique data construct called a transaction vector by combining transaction vector attributes and a ledger specification (which together make up the transaction vector) that are themselves unique data constructs and include (combinations of) parameters not found in prior systems. In some cases, a transaction vector designates or defines transactions that follow, coincide with, or conform to, the structure or definitions of the transaction vector as valid, executable network transactions with viable execution paths for an inter-network facilitation system to perform or carry out. The vector configurator system can further store the transaction vector within a database or a repository.

In certain embodiments, the vector configurator system generates or determines the transaction attributes and/or the ledger specification for a transaction vector. For example, the vector configurator system receives client device interactions (e.g., from one or more administrator devices) defining network transactions that are valid and executable by an inter-network facilitation system. For instance, the vector configurator system receives indications of certain parameters called transaction attributes that form one part of a transaction vector and that include parameters that research indicates impact or influence asset movement universally for many types of network transactions. Such parameters or transaction attributes may include, for instance, an account type for a user account associated with a network transaction or a movement trigger classification indicating a reason for the network transaction. In addition to the transaction attributes, the vector configurator system can receive indications of other parameters that form a ledger specification, where the ledger specification makes up part of a transaction vector and includes instructions for how asset movement is handled by a ledger network component. The vector configurator system can further combine the transaction attributes and the ledger specification to form the transaction vector.

As suggested, the vector configurator system can also utilize stored transaction vectors to facilitate execution of network transactions. In particular, the vector configurator system can receive a transaction request from a client device or from a third party system, where the transaction request prompts or requests movement of digital assets from a third party system to a digital account, from one digital account to another, or from a digital account to a third party system. In response to the transaction request, the vector configurator system can utilize a transaction network component to analyze the request and extract attributes from the request. Upon extracting the transaction attributes, the vector configurator system can also create a network transaction, or an asset movement, for the request within the inter-network facilitation system, where the network transaction indicates the extracted attributes.

In some embodiments, the vector configurator system can utilize a journal network component to verify or validate the network transaction of the request. For example, the vector configurator system can pass the extracted transaction attributes from transaction network component to the journal network component, whereupon the vector configurator system can utilize the journal network component to cross-check the extracted attributes with stored transaction vectors in a transaction vector repository. Indeed, the vector configurator system can compare the extracted attributes from the request with stored attributes of stored vectors which define valid, executable transactions (or asset movements) for the inter-network facilitation system.

Based on the comparison, the vector configurator system can validate or reject the transaction request. More particularly, the vector configurator system can utilize the journal network component to verify whether the set of transaction attributes of the request match or correspond to any stored set of transaction attributes of transportation vectors within the repository (e.g., the repository maintained by the program configurator component). Upon determining that the repository includes a vector having a set of the attributes that match or correspond to the attribute set from the request, the vector configurator system can validate the network transaction of the request as a valid, executable network transaction. However, upon determining that no corresponding set of transaction attributes is stored in the repository, the vector configurator system can reject or deny the transaction request (because the request is for an invalid or non-executable asset movement).

Additionally, the vector configurator system can access and select the transaction vector (from the repository) corresponding to the request to guide execution or performance of the network transaction for the request. For example, the vector configurator system can utilize the journal network component to generate and publish a transaction event to an event stream, where the event includes the transaction vector from the repository. In turn, the vector configurator system can further utilize a ledger network component to consume the transaction vector and to execute the transaction (or asset movement) according to the ledger specification of the vector.

As suggested above, the disclosed vector configurator system provides several improvements or advantages over conventional networking systems. For example, the vector configurator system can improve efficiency over prior systems. As opposed to prior systems that require excessive volumes of computer storage for storing attributes for each separate network transaction as its own data entry, the vector configurator system can reduce the storage requirements of network transaction attributes by introducing transaction vectors. By implementing a transaction vector that includes a specific set of transaction attributes applicable across multiple network transactions, the vector configurator system can condense the storage of transaction attributes into consolidated vectors at a centralized storage location. Indeed, rather than individually storing each attribute for every network transaction, the vector configurator system can group transaction attributes into transaction vectors for consolidated, condensed storage (where the attributes of the vectors are referenced by and applicable to multiple different network transactions). As a result of implementing transaction vectors for condensed storage, the vector configurator system preserves computer memory and storage resources wasted by prior systems that use less efficient techniques.

As another example of the improved efficiency of the vector configurator system, the vector configurator system can reduce the computer processing requirements of prior systems. For example, not only do many prior systems require excessively large databases, but prior systems often need to regenerate or redefine transaction pipelines for each network transaction in order to carry out each such network transaction. By contrast, the vector configurator system utilizes transaction vectors and an adaptive set of network components to execute network transactions more efficiently. For example, rather than redefining a new pipeline for each transaction, the vector configurator system can generate transaction vectors that include attributes applicable across many different network transactions and can pass the vectors through a consistent, one-size-fits-all set of network components (e.g., consistent across different transactions) to execute the network transaction without redefining the pipeline for each request. Consequently, the vector configurator system requires less processing power compared to existing systems. Such processing improvements are especially pronounced in larger systems, where the number of transactions is greater (and therefore requires more processing).

In addition to improving efficiency, the vector configurator system can also improve flexibility and data security over existing networking systems. While some existing network systems are rigidly fixed to redefining pipelines (e.g., network components for executing a transaction according to determined transaction data) for separate requests, the vector configurator system can utilize transaction vectors (and a common set of network components) that are adaptable across multiple different network transactions, including newly configured network transactions added to the system (which would require whole new pipelines in prior systems) and/or requests, eliminating or reducing the need to redefine the pipeline for each new transaction/request. By improving the flexibility in this way, the vector configurator system further reduces latency (e.g., increases speed) to free up resources of implementing computing devices for performing other functions. Additionally, the transaction vectors improve the data security of the vector configurator system by increasing the traceability of transaction data using the transaction vector that is consistently (e.g., across various network transactions) passed among network components.

As indicated by the foregoing discussion, the present disclosure utilizes a variety of terms to describe features and advantages of the vector configurator system. For example, as used herein, the term "inter-network facilitation system" refers to a system that, via the vector configurator system, facilitates digital communications across different computing systems over one or more networks. For example, an inter-network facilitation system manages digital accounts, such as credit accounts, bank accounts, transaction card accounts, and secured accounts in addition to financial information, such as asset/funds transfers, withdrawals, deposits, and loans for one or more user profiles registered within the inter-network facilitation system. In some cases, the inter-network facilitation system is a centralized network system that includes multiple network components for facilitating access to online digital accounts via a central network location. Indeed, the inter-network facilitation system can link accounts from different network-based financial institutions to provide information regarding, and management tools for, the different accounts.

Relatedly, as used herein, the term "digital account" (or sometimes simply "account") refers to a network-based repository of digital information for a particular client device or user. Because a digital account can be specific to a user, references to a "digital account" include a "user account." For example, a digital account can include a repository of digital information corresponding to a client having a particular configuration of attributes or parameters for performing network transactions. In some cases, an account can have a certain account type, such as a bank account, a credit account, a debit card account, or some other network-based account for managing assets associated with a user profile of an inter-network facilitation system. An account can include a "source account" that refers to an initiating or originating account form which assets are transferred as part of a network transaction. Alternatively, an account can include a "target account" that refers to a digital account that is the destination or endpoint of assets transferred as part of a network transaction.

Related to accounts, the term "product" refers to a network-based repository of baseline digital information (e.g., baseline information applicable to one or more accounts). For example, a product includes a repository having a default or baseline configuration of attributes or parameters for performing network transactions associated with one or more accounts. For instance, a product can include a type or format for one or more financial offerings provided by financial institutions, such as a bank account, a debit card account, a cash card account, a credit card account, or a gift card account.

Along these lines, the term "network transaction" (or sometimes simply "transaction") refers to an asset movement associated with one or more accounts of an inter-network facilitation system. In particular, a network transaction can include data or information instructing network components to move assets to or from a digital account. For instance, a network transaction can include asset movement to transfer funds from a source account to a target account, from a third party system to a target account, and/or from a source account to a third party system.

As indicated above, the vector configurator system can utilize a transaction vector to define and carry out a network transaction. As used herein, the term "transaction vector" (or sometimes simply "vector") refers to a data construct that includes a set of transaction attributes and a ledger specification grouped together. For example, a transaction vector can include a universal set of transaction attributes that apply to, or are included in, a plurality of network transactions. Thus, a transaction vector can indicate a certain type of transaction that is valid and executable within an inter-network facilitation system. A transaction vector can also include instructions for how to execute a network transaction using one or more network components (and/or the transaction attributes). In some embodiments, a transaction vector groups together a unique set of transaction attributes and a ledger specification that prior systems have previously not grouped together or used as a reference for other network transactions.

Relatedly, the term "transaction attribute" refers to an attribute or a parameter (e.g., a key-value pair) of a network transaction that is determined to be, or designated as, applicable to other network transactions executable by a same system or network of systems. In some cases, a transaction attribute includes an attribute or parameter of a network transaction that is universally applicable to every network transaction executable by an inter-network facilitation system. While a network transaction can have more attributes on top of the key transaction attributes, a set of transaction attributes can define a valid network transaction for the inter-network facilitation system, and a different set can define a different network transaction. In some cases, the set of transaction vectors includes: 1) an account type of a user profile associated with the network transaction, 2) an indication of a system (e.g., a bank) that hosts the account, 3) a movement trigger classification indicating a reason for moving assets associated with the account, 4) a direction for the network transaction, 5) an indication of a processor that processes or executes the network transaction, and 6) an indication of a network over which the network transaction will be processed.

Relatedly, the term "movement trigger classification" refers to a motivation, reason, or instigating factor for performing a network transaction. In particular, a movement trigger classification can indicate an event, an action, or a cause that initiates a network transaction. In some cases, a movement trigger classification indicates a type, category, or classification of a transaction. Example movement trigger classifications can include: 1) a card purchase classification that indicates that the reason to move assets is a purchase using a payment card, 2) a pay friends classification that indicates that the reason to move assets is a request by a user profile to pay friends some amount (e.g., using a mobile payment application), 3) a check deposit classification that indicates that the reason to move assets is depositing a check into an account, 4) a withdrawal classification that indicates that the reason to move assets is a request to withdraw assets from an account, or 5) an account-to-account transfer classification that indicates that the reason to move assets is a request to transfer assets from one account to another.

In addition, the term "ledger specification" refers to a set of parameters or computer instructions that define or indicate how to execute or process a network transaction. For example, a leger specification includes computer code that instructs one or more network components on execution of a network transaction to, for instance, transfer assets from one account to another. In some cases, ledger specifications include the following: 1) an execution system responsible for settling or processing the network transaction, 2) a source account from which assets are transferred as part of the transaction, 3) a target account to which assets are transferred as part of the transaction, and 4) a shortcode that includes computer code representing (in an abbreviated format) the transaction attributes of the network transaction.

Additionally, the term "network component" (or sometimes simply "component") refers to a computer application or subsystem operated by one or more processors (hosted by one or more servers) that are dedicated to a particular computer task or process. For example, a network component can be part of a larger network-based system and can be communicatively coupled (e.g., via a computer network) to other network components for passing data therebetween to form a networking environment of cooperating network components. A network component can perform one or more tasks associated with one or more applications (e.g., client device applications) that access an inter-network facilitation system. Thus, an inter-network facilitation system can include multiple (containerized) network components that each perform respective functions as subsystems within the system. In certain embodiments, a network component refers to a server running a specific process, where a publisher network component refers to a first server and a subscriber network component refers to a second server. In some cases, one network component receives and/or provides digital communications to a client device while another network component generates a digital payload for a request received from the client device (e.g., a request to generate a user profile or a request to transfer funds to another user profile) and yet another network component receives the digital payload to perform the requested function.

Additional detail regarding the vector configurator system will now be provided with reference to the figures. In particular, FIG. 1 illustrates a block diagram of a system environment (or "environment") 100 for implementing an inter-network facilitation system 104 and a vector configurator system 106 in accordance with one or more embodiments. As shown in FIG. 1, the environment 100 includes server device(s) 102, various transaction computer network devices 110*a*-110*c*, third party processing server(s) 112, data management server(s) 114, administrator device(s) 116, and client device(s) 118 connected via a network 108. While FIG. 1 shows an embodiment of the vector configurator system 106, alternative embodiments and configurations are possible. Furthermore, although FIG. 1 illustrates the vector configurator system 106 being implemented by a particular component and/or device within the environment 100, the vector configurator system 106 can be implemented, in whole or in part, by other computing devices and/or components in the environment 100 (e.g., the administrator device(s) 116 and/or the client device(s) 118). Additional description regarding the illustrated computing devices is provided with respect to FIGS. 8-9 below.

As shown in FIG. 1, the server device(s) 102 can include the inter-network facilitation system 104. In some embodiments, the inter-network facilitation system 104 determines, stores, generates, and/or displays financial information corresponding to a digital account (e.g., a banking application, a money transfer application). Furthermore, the inter-network facilitation system 104 can electronically communicate (or facilitate) financial transactions between one or more digital accounts (and/or computing devices). In some embodiments, the inter-network facilitation system 104 also tracks and/or monitors financial transactions and/or financial transaction behaviors of a user within a user profile.

Indeed, in some examples, the inter-network facilitation system 104 facilitates financial transactions and digital communications across different computing systems and/or network components over one or more transaction computer networks. Indeed, as shown, the environment 100 also includes transaction computer network devices 110a-110c (or "transaction computer networks"). The transaction computer network devices 110a-110c can include a variety of computer devices for implementing, facilitating, processing, or executing a transaction. Thus, for instance, the transaction computer network devices 110a can include a card transaction computer network for implementing a variety of transactions using cards (e.g., credit cards, debit cards, etc.). Similarly, the transaction computer network devices 110b can include an ACH transaction computer network (e.g., computing devices for implementing ACH transactions), and the transaction computer network devices 110c can include a transfer transaction computer network (e.g., computing devices for implementing transfer transactions between accounts).

For example, the inter-network facilitation system 104 manages digital accounts, such as credit accounts, secured accounts, and other accounts for a single account registered within the inter-network facilitation system 104. In some cases, the inter-network facilitation system 104 is a centralized network system that facilitates access to online banking accounts, credit accounts, and other accounts within a central network location. Indeed, the inter-network facilitation system 104 can link accounts from different network-based financial institutions (e.g., the transaction computer network devices 110a-110c) to provide information regarding, and management tools for, the different accounts. Furthermore, the vector configurator system 106 can provide various user interfaces and information for display (e.g., via the administrator device(s) 116 and/or the client device(s) 118).

As also illustrated in FIG. 1, the environment 100 includes the administrator device(s) 116 and the client device(s) 118. For example, the administrator device(s) 116 and the client device(s) 118 may include, but are not limited to, a mobile device (e.g., smartphone, tablet) or other type of computing device, including those explained below with reference to FIGS. 8-9. For example, the administrator device(s) 116 can include computing devices that display user interfaces for administrating or managing settings, configurations, pipelines, or data for the inter-network facilitation system 104. Moreover, the client device(s) 118 can include computing devices associated with (and/or operated by) users and corresponding user profiles for the inter-network facilitation system 104. In some embodiments, the client device(s) 118 include computing devices that display user interfaces for managing digital accounts (e.g., transferring assets, making payments, etc.) and/or portraying information regarding digital accounts (e.g., account transactions, account balances, etc.). Moreover, although FIG. 1 illustrates a single instance of the administrator device(s) 116 and the client device(s) 118, the environment 100 can include various numbers of administrator or client devices that communicate and/or interact with the inter-network facilitation system 104 and/or the vector configurator system 106.

In one or more embodiments, the client device(s) 118 include a client application. The client application can include instructions that (upon execution) cause the client device(s) 118 to perform various actions. For example, a user associated with an account can interact with the client application on the client device(s) 118 to access financial information, initiate a financial network transaction, or modify account settings. In some embodiments, the administrator device(s) 116 also includes an administrator application similar to the client application. The client application may be a web application or a native application (e.g., a mobile application, a desktop application, etc.). In one or more implementations, the client application interfaces with the inter-network facilitation system 104 to provide digital content including graphical user interfaces to the client device(s) 118. In one or more implementations, the client application comprises a browser that renders graphical user interfaces on the display of the client device(s) 118.

In certain instances, the client device(s) 118 corresponds to one or more user profiles (e.g., user profiles stored at the server device(s) 102). For instance, a user of a client device can establish a user profile with login credentials and various information corresponding to the user. In addition, the digital accounts and/or user profiles can include information regarding financial information and/or financial transaction information for users (e.g., name, telephone number, address, bank account number, credit amount, debt amount, financial asset amount), payment information, transaction history information, and/or contacts for financial transactions. In some embodiments, a digital account and/or a user profile can be accessed via multiple devices (e.g., multiple client devices) when authorized and authenticated.

The present disclosure utilizes client devices to refer to devices associated with such user profiles. In referring to a client device, the disclosure and the claims are not limited to communications with a specific device, but any device corresponding to a user profile of a particular user. Accordingly, in using the term computing device, this disclosure can refer to any computing device corresponding to a user profile of an inter-network facilitation system.

As shown, the environment 100 also includes third party processing server(s) 112. For example, in one or more embodiments, the inter-network facilitation system 104 utilizes the third party processing server(s) 112 to assist in processing transactions (e.g., managing a system of record, transferring funds between accounts, implementing transaction pipelines, etc.). The third party processing server(s) 112 can include a variety of server devices, as described below in relation to FIGS. 8-9.

Furthermore, as illustrated in FIG. 1, the environment 100 also includes data management server(s) 114. The data management server(s) 114 can include integrated or external (e.g., third party) servers for storing, analyzing, and managing data volumes. For example, the data management server(s) 114 can include a variety of cloud/web-based systems for storing, processing, analyzing, and delivering transaction data and/or account data. The data management server(s) 114 can include a variety of server devices, as described with regard to FIGS. 8-9.

As further shown in FIG. 1, the environment 100 includes the network 108. As mentioned above, the network 108 can enable communication between components of the environment 100. In one or more embodiments, the network 108 may include a suitable network and may communicate using a various number of communication platforms and technologies suitable for transmitting data and/or communication signals, examples of which are described with reference to FIGS. 8-9. Furthermore, although FIG. 1 illustrates the server device(s) 102, the transaction computer network devices 110a-110c, the third party processing server(s) 112, the data management server(s) 114, and the administrator device(s) 116 communicating via the network 108, the various components of the environment 100 can communicate and/or interact via other methods (e.g., the server device(s) 102 and the administrator device(s) 116 can communicate directly).

Figure 2:
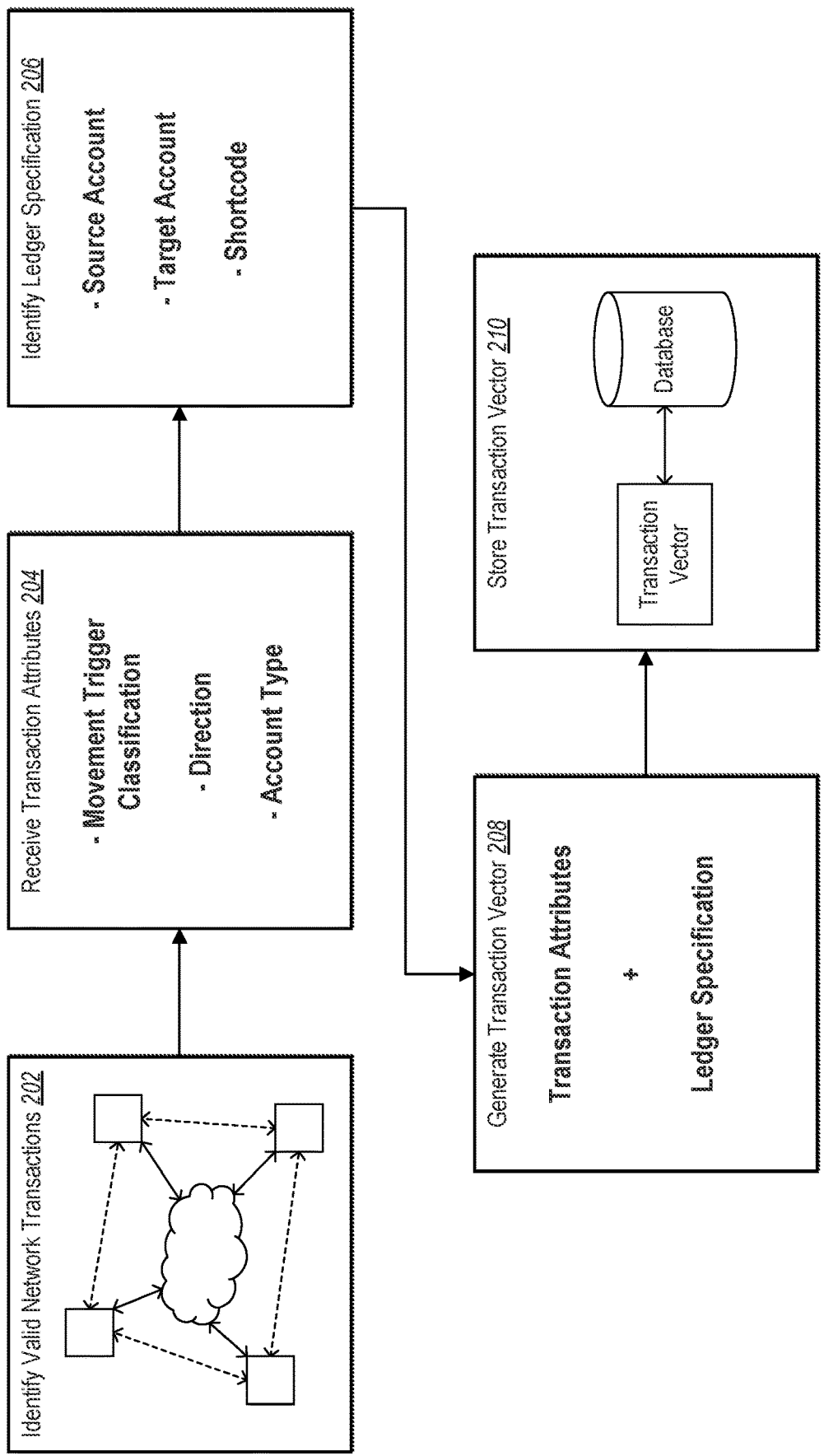
FIG. 2 illustrates an example overview of generating and storing transaction defining valid, executable network transactions in accordance with one or more embodiments.

As mentioned, in certain embodiments, the vector configurator system 106 can generate and store transaction vectors within a transaction vector repository. In particular, the vector configurator system 106 can generate transaction vectors that define which (types of) network transactions are valid and executable within the inter-network facilitation system 104. FIG. 2 illustrates an overview of generating and storing transaction vectors in accordance with one or more embodiments. Additional detail regarding the various acts of FIG. 2 is provided thereafter with reference to subsequent figures.

As illustrated in FIG. 2, the vector configurator system 106 performs an act 202 to identify valid network transactions. In particular, the vector configurator system 106 identifies valid network transactions as types of asset movements that are designated as approved or permitted ways to transfer assets among accounts. In some cases, the vector configurator system 106 receives client device interactions (e.g., from administrator device(s) 116) to define valid transactions. For example, the vector configurator system 106 receives indications of asset movements that the inter-network facilitation system 104 is capable of performing and which are permissible.

As further illustrated in FIG. 2, the vector configurator system 106 performs an act 204 to receive transaction attributes. More specifically, the vector configurator system 106 receives transaction attributes (e.g., from administrator device(s) 116) that define the network transactions indicated as valid for the inter-network facilitation system 104. For example, the vector configurator system 106 receives or determines a universal set of transaction attributes as key-value pairs that define a format, shape, or structure of transaction data for valid, executable network transactions. Thus, as described further below, the vector configurator system 106 can validate and execute a network transaction that conforms to a defined set of transaction attributes and can reject a network transaction that does not conform to a defined set of transaction attributes. In some cases, the vector configurator system 106 determines transaction attributes by analyzing previous network transactions and selecting or extracting attributes shared among at least a threshold number of previous network transactions.

As further illustrated in FIG. 2, the vector configurator system 106 can perform an act 206 to identify a ledger specification. More particularly, the vector configurator system 106 can identify a ledger specification that defines or includes computer instructions for performing or executing a network transaction. In some cases, the vector configurator system 106 determines or receives a ledger specification for each set of transaction attributes. Thus, the vector configurator system 106 receives (e.g., from administrator device(s) 116) computer instruction sets for executing an asset movement for a network transaction defined by a set of transaction attributes. A ledger specification can have a particular format or structure consistent across network transactions, including indications of an execution system, a source account, a target account, and transaction-specific shortcode for executing the movement of assets in relation to the source account and the target account.

In addition to (or as part of) a ledger specification, the vector configurator system 106 can utilize one or more other components as part of a transaction vector. For example, the vector configurator system 106 can determine and utilize transaction limits to include within a transaction vector. More specifically, the vector configurator system 106 determines specific limits (e.g., transaction amounts) corresponding to particular types of transactions (and/or corresponding to particular transaction attributes). In some cases, the vector configurator system 106 determines a transaction limit for transferring or moving assets from (or to) a particular account. Transaction limits can vary per account type and/or according to different transaction attributes. The vector configurator system 106 can thus generate a transaction vector to include transaction attributes, a ledger specification, and/or a transaction limit. In some embodiments, the vector configurator system 106 can further determine other vector components to include within a transaction vector, such as metadata indicating merchant categories for categorizing transactions according to specific categories or labels (e.g., "groceries," "rent," "home improvement," etc.).

In addition, the vector configurator system 106 can perform an act 208 to generate a transaction vector. In particular, the vector configurator system 106 can generate a transaction vector by combining a set of transaction attributes and a ledger specification. For example, the vector configurator system 106 generates transaction vectors for each valid network transaction by combining its respective transaction attributes and corresponding ledger specification (e.g., as indicated by administrator devices(s) 116). In some cases, the vector configurator system 106 generates a transaction vector for each valid, executable asset movement performable by network components of the inter-network facilitation system 104.

As further illustrated in FIG. 2, the vector configurator system 106 performs an act 210 to store a transaction vector. For example, the vector configurator system 106 stores a transaction vector within a transaction vector repository to use as an index or validation database for validating and/or rejecting transaction requests. Indeed, the vector configurator system 106 can store each transaction vector defining the form or structure for each (type of) valid network transaction, including its transaction vectors and ledger specification, within a database (managed by the data management server(s) 114) or transaction vector repository.

Figure 3:
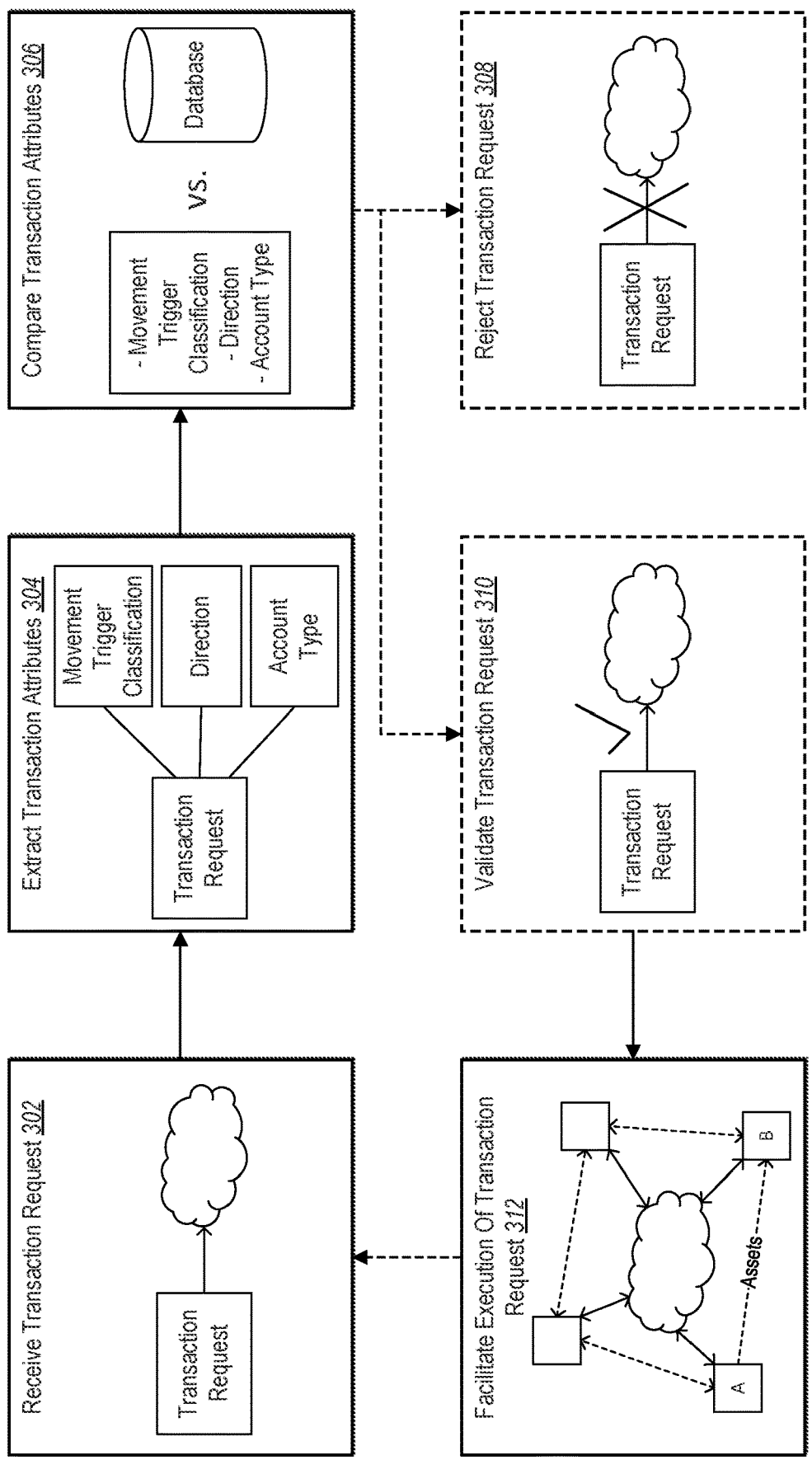
FIG. 3 illustrates an example overview of utilizing a transaction vector and a specific set of network components for executing a network transaction for a transaction request in accordance with one or more embodiments.

As mentioned above, in certain described embodiments, the vector configurator system 106 can access and utilize transaction vectors to validate and execute a network transaction for a transaction request. In particular, the vector configurator system 106 can extract transaction attributes from a received transaction request and can select a stored transaction vector that corresponds to the extracted attributes to utilize for processing the transaction for the request. FIG. 3 illustrates an overview of accessing and utilizing a transaction vector for a transaction request in accordance with one or more embodiments. Additional detail regarding the acts of FIG. 3 is provided thereafter with reference to subsequent figures.

As illustrated in FIG. 3, the vector configurator system 106 performs an act 302 to receive a transaction request. In particular, the vector configurator system 106 receives a request (e.g., from client device(s) 118 or from third party processing server(s) 112) to perform a network transaction to move assets among digital accounts of the inter-network facilitation system 104. For example, the vector configurator system 106 receives a request to transfer assets from one account to another within the inter-network facilitation system 104, or to deposit assets from a third party system into an account of the inter-network facilitation system 104, or to move assets from an account of the inter-network facilitation system 104 to a third party system.

Based on receiving the transaction request, the vector configurator system 106 performs an act 304 to extract transaction attributes. More specifically, the vector configurator system 106 can extract or determine transaction attributes from the data of the received transaction request. In some cases, the transaction request includes some portions of computer code that are interpretable by the vector configurator system 106 and other portions of computer code that are superfluous or platform-specific to a requesting system (e.g., specific to the client device(s) 118 or the third party processing server(s) 112). Accordingly, the vector configurator system 106 can analyze the transportation request to extract or determine the set of transaction attributes (disregarding other information) that includes the six attributes indicated above: 1) account type, 2) host system, 3) movement trigger classification, 4) direction, 5) processor, and 6) network. Indeed, the vector configurator system 106 determines the same set of six attributes (those determined to be key defining attributes) for each transaction request. Additional detail regarding each of the key transaction attributes is provided below.

As further illustrated in FIG. 3, the vector configurator system 106 performs an act 306 to compare transaction attributes. To elaborate, the vector configurator system 106 compares the extracted transaction attributes from the transaction request with stored transaction attributes of transaction vectors within a database or transaction vector repository. For example, the vector configurator system 106 compares the extracted attribute set with stored attributes sets in the repository to determine whether the extracted set matches, corresponds to, or conforms to, the (structure of) any stored set of attributes. Specifically, the vector configurator system 106 compares the movement trigger classification, the direction, the account type, and other attributes extracted from the request to determine whether any stored transaction vector includes matching attributes. For instance, the vector configurator system 106 checks to see if a movement trigger classification (e.g., a reason for the asset movement) as a valid classification (e.g., a valid reason).

Based on the comparison, in some embodiments, the vector configurator system 106 performs an act 308 to reject a transaction request. More particularly, the vector configurator system 106 determines that the transaction vector repository includes no transaction vector with an attribute set that matches or corresponds to the attributes extracted from the transaction request. Thus, the vector configurator system 106 determines that the transaction request is requesting an invalid or non-executable asset movement, and the vector configurator system 106 accordingly declines or rejects the request. In some cases, the vector configurator system 106 rejects a request based on determining that no stored vectors include each of the extracted attributes (e.g., matching all six attributes). In other cases, the vector configurator system 106 rejects a request based on determining that no stored vectors include at least a threshold number (e.g., four or more) or percentage of the extracted attributes.

In one or more embodiments, the vector configurator system 106 performs an act 310 to validate a transaction request based on the comparison of the act 306. To elaborate, based on the comparison, the vector configurator system 106 determines that the transaction vector repository includes a transaction vector with a set of attributes that matches or corresponds to the attributes extracted from the request. In some cases, the vector configurator system 106 validates a request based on determining that a stored vector includes each of the extracted attributes (e.g., matching all six attributes). In other cases, the vector configurator system 106 validates a request based on determining that a stored vector includes at least a threshold number (e.g., four or more) or percentage of the extracted attributes.

In one or more cases, upon validating a transaction request, the vector configurator system 106 caches or stores the validation. For example, the vector configurator system 106 stores a validation for a particular transaction vector or a given set up transaction attributes. Thus, upon receiving a subsequent transaction request later on that includes matching transaction attributes already validated, the vector configurator system 106 can expedite validation or bypass the validation process and can facilitate execution of the request. Indeed, the vector configurator system 106 can access the cached validation for matching subsequent requests.

As further illustrated in FIG. 3, the vector configurator system 106 performs an act 312 to facilitate execute of a transaction request. In particular, the vector configurator system 106 utilizes one or more network components to facilitate execution or processing of asset movement for the transaction request. For example, the vector configurator system 106 moves assets according to a ledger specification of a matching transaction vector (e.g., a transaction vector whose transaction attributes are determined to correspond to the request based on the comparison). In some cases, as dictated by the ledger specification, the vector configurator system 106 transfers assets using a ledger network component to move the assets between accounts of the inter-network facilitation system 104 and/or to or from third party systems (associated with the third party processing server(s) 112). As shown, the vector configurator system 106 moves assets from account A to account B according to a ledger specification. As also shown, the vector configurator system 106 can further repeat the acts illustrated in FIG. 3 for different transportation requests, extracting and comparing attributes for each received request to reject or validate the requests as described.

Figure 4:
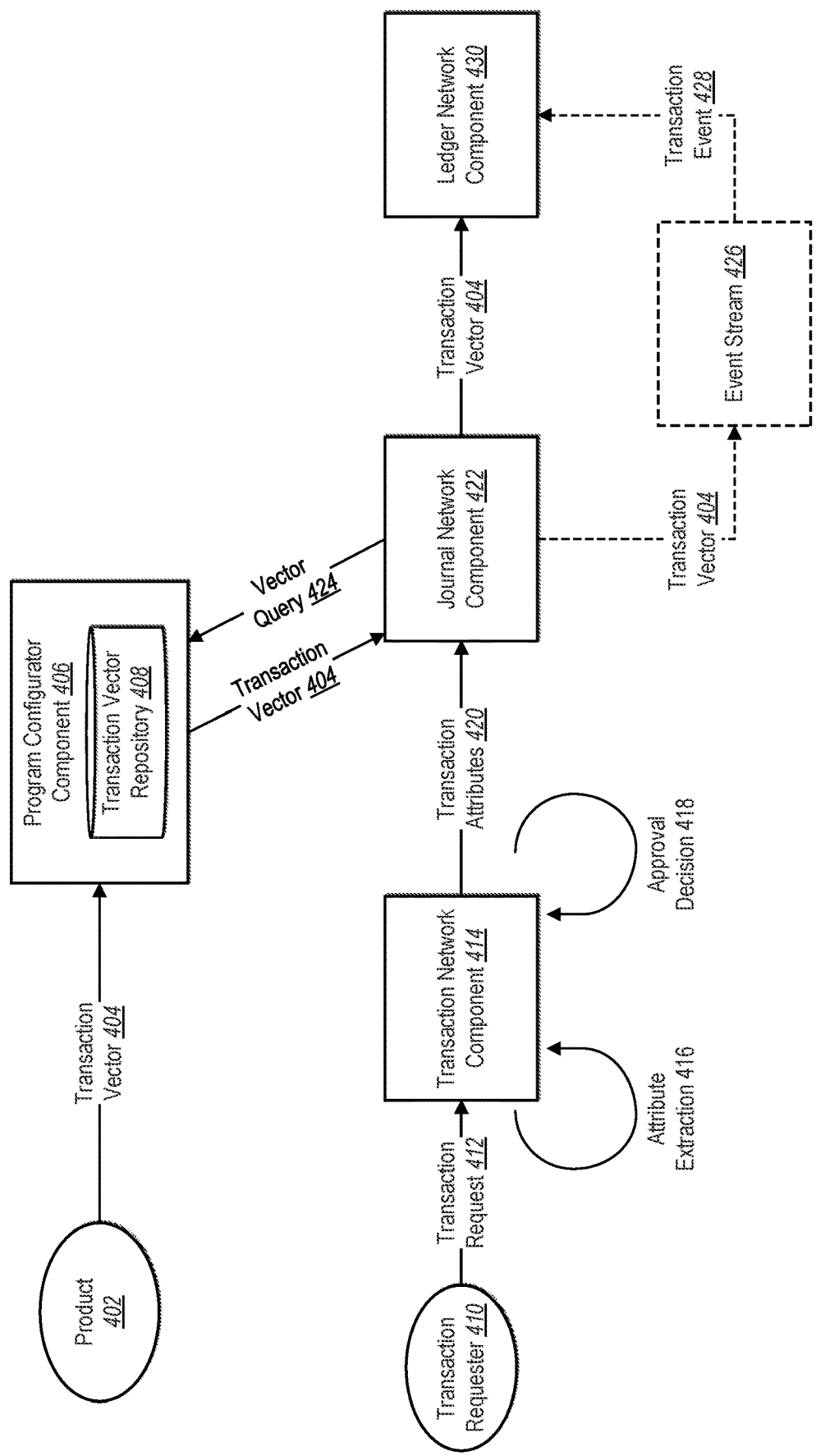
FIG. 4 illustrates an example diagram for generating and utilizing a transaction vector via network components of inter-network facilitation system in accordance with one or more embodiments.

As mentioned, in certain embodiments, the vector configurator system 106 generates, stores, and utilizes transaction vectors for performing asset movement within the inter-network facilitation system 104. In particular, the vector configurator system 106 can utilize network components to store transaction vectors for comparing with transaction requests and to determine parameters that dictate the movement of assets for the requests. FIG. 4 illustrates an example diagram of generating, storing, and utilizing transaction vectors and a core set of network components to facilitate transaction requests in accordance with one or more embodiments.

As illustrated in FIG. 4, the vector configurator system 106 identifies or determines a product 402. For example, the vector configurator system 106 identifies the product 402 as a type of product or account that is available to user profiles to the inter-network facilitation system 104. Specifically, the vector configurator system 106 identifies a product as a type or format for one or more network-based financial offerings provided by financial institutions, such as a bank account, an advancement account, a reward account, a debit card account, a cash card account, a credit card account, or a gift card account. For instance, the vector configurator system 106 identifies the product 402 as a new incentive for transferring assets to an account of a user profile based on receiving a threshold number of transactions from the user profile.

Based on identifying or determining the product 402, the vector configurator system 106 generates a transaction vector 404. More specifically, the vector configurator system 106 generates the transaction vector 404 based on the product 402 to, for example, define how to move assets according to the product 402. For example, the vector configurator system 106 generates the transaction vector 404 to include transaction attributes that define a type of valid transaction that is executable for the product 402 and to further include a ledger specification that includes computer instructions for how to process asset movement for the product 402. Based on the above example of the product 402 that incentivizes user profiles to perform a threshold number of transactions, for instance, the vector configurator system 106 can generate a transaction vector 404 that defines asset movement for transferring assets to accounts of user profiles that perform the threshold number of transactions within the inter-network facilitation system 104.

As further illustrated in FIG. 4, the vector configurator system 106 stores the transaction vector 404 within a transaction vector repository 408. More particularly, the vector configurator system 106 utilizes a specialized network component, the program configurator component 406, to manage or maintain transaction vectors (including the transaction vector 404). For instance, the program configurator component 406 maintains and stores transaction vectors within the transaction vector repository 512. By maintaining transaction vectors created for specific products offered by the inter-network facilitation system 104, the program configurator component 406 dictates which (types of) network transactions or asset movements are valid within the inter-network facilitation system 104. Indeed, any asset movements that do not have a corresponding transaction vector stored within the transaction vector repository 408 are deemed invalid or non-executable.

In addition to generating and storing the transaction vector 404 within the transaction vector repository 408, the vector configurator system 106 can further process a network transaction for a transaction request. Indeed, as shown in FIG. 4, the vector configurator system 106 receives a transaction request 412 from a transaction requester 410. Specifically, the vector configurator system 106 receives the transaction request 412 from a transaction requester 410 in the form of a client device (e.g., from among the client device(s) 118) or a third party system (e.g., the third party processing server(s) 112). For example, the vector configurator system 106 receives the transaction request 412 to transfer assets from an omnibus reward account (e.g., an account created to hold assets for rewarding user profiles that perform the threshold number of transactions) to accounts specific to user profiles of the inter-network facilitation system 104.

Based on receiving the transaction request 412, the vector configurator system 106 can utilize a specialized network component, the transaction network component 414, to process or analyze the transaction request 412. In particular, the transaction network component 414 analyzes the transaction request 412 to perform attribute extraction 416 and an approval decision 418. For example, the transaction network component 414 analyzes the transaction request 412 to extract a set of key transaction attributes from the transaction request 412.

In addition, the transaction network component 414 makes an approval decision 418 using internal logic. For example, the transaction network component 414 analyzes the transaction request 412 to determine whether the transaction request 412 includes the necessary information to execute a request using network components of the inter-network facilitation system 104. Specifically, based on the attribute extraction 416, the transaction network component 414 determines whether the transaction request 412 includes a complete set of transaction attributes (e.g., including all six attributes described above). Based on determining that the transportation request 412 includes a complete set of transaction attributes, the transaction network component 414 approves the transaction request. On the other hand, based on determining that the transportation request 412 does not include a complete set of transaction attributes (e.g., missing more than a threshold number of attributes), the transaction network component 414 denies the transaction request 412. In some cases, the transaction network component 414 can use additional logic to cross-check keys and/or values of extracted attributes to determine whether the keys and/or values of the transaction request 412 are valid (e.g., in a compatible format or structure).

As further illustrated in FIG. 4, the vector configurator system 106 passes the transaction attributes 420 extracted from the transaction request 412 (e.g., via the attribute extraction 416 performed by the transaction network component 414) to a journal network component 422. To elaborate, the vector configurator system 106 utilizes the journal network component 422 to verify or validate the transaction request 412 according to its transaction attributes 420. For example, the journal network component 422 generates a vector query 424 from the transaction attributes 420 and passes the vector query 424 to the program configurator component 406.

In response to the vector query 424, the journal network component 422 receives an indication of whether the transaction vector repository 408 includes a transaction vector that matches or corresponds to the transaction request 412 (e.g., a transaction vector that includes transaction attributes matching the transaction attributes 420 extracted from the transaction request 412). If no such transaction vector is stored in the transaction vector repository 408, the journal network component 422 rejects the transaction request 412. However, if the transaction vector repository 408 includes a transaction vector (e.g., the transaction vector 404) with attributes matching the transaction attributes 420, the journal network component 422 receives the transaction vector from the program configurator component 406. As shown, the journal network component 422 retrieves or receives the transaction vector 404. In some cases, the journal network component 422 receives an indication of a force-post asset movement where the journal network component 422 approves the transaction request 412 even if there is no corresponding transaction vector stored in the transaction vector repository 408.

In response to accessing the transaction vector 404 for the transaction request 412, the vector configurator system 106 provides the transaction vector 404 to a ledger network component 430. In particular, the vector configurator system 106 utilizes the journal network component 422 to pass the transaction vector 404 to the ledger network component 430. As shown, in some embodiments, the journal network component 422 publishes the transaction vector 404 to an event stream 426 to make the transaction vector 404 available to downstream network components (and/or third party systems) for consumption. For example, the journal network component 422 generates and publishes a transaction event 428 to the event stream 426, where the transaction event 428 includes (event data corresponding to) the transaction vector 404.

In turn, the ledger network component 430 ingests, receives, or consumes the transaction vector 404 (e.g., as part of the transaction event 428) to facilitate asset movement. In response to receiving the transaction vector 404, the ledger network component 430 determines how to process the asset movement defined by the transaction vector 404 (and requested by the transaction request 412). For instance, the ledger network component 430 determines to move assets from one account to another (and/or to or from a third party system). The vector configurator system 106 can thus perform the asset movement according to the ledger specification of the transaction vector 404. In some embodiments, by publishing the transaction vector 404 to the event stream 426, the vector configurator system 106 facilitates ingestion of the transaction vector 404 by other network components of the inter-network facilitation system 104.

As an example of the process described and illustrated in FIG. 4, the vector configurator system 106 can generate a new asset flow to provide assets to an account associated with a user profile (of the inter-network facilitation system 104) for every thirtieth transaction the user profile performs within the inter-network facilitation system 104. To facilitate this new asset flow, the vector configurator system 106 generates an intermediate omnibus account to hold the assets for transferring to user accounts. In addition, the vector configurator system 106 generates a new transaction vector (e.g., the transaction vector 404) to store within the program configurator component 406. In response to receiving the transaction request 412 (e.g., to move assets to an account in response to detecting that a user profile performs the thirtieth transaction), the vector configurator system 106 validates the request by extracting the transaction attributes 420 from the transaction request 412 and comparing the transaction attributes 420 with attributes the transaction vector 404 stored in the transaction vector repository 408. Further, the vector configurator system 106 publishes the transaction vector 404 to provide the transaction vector 404 to the ledger network component 430 for moving the assets to the user account.

Figure 5:
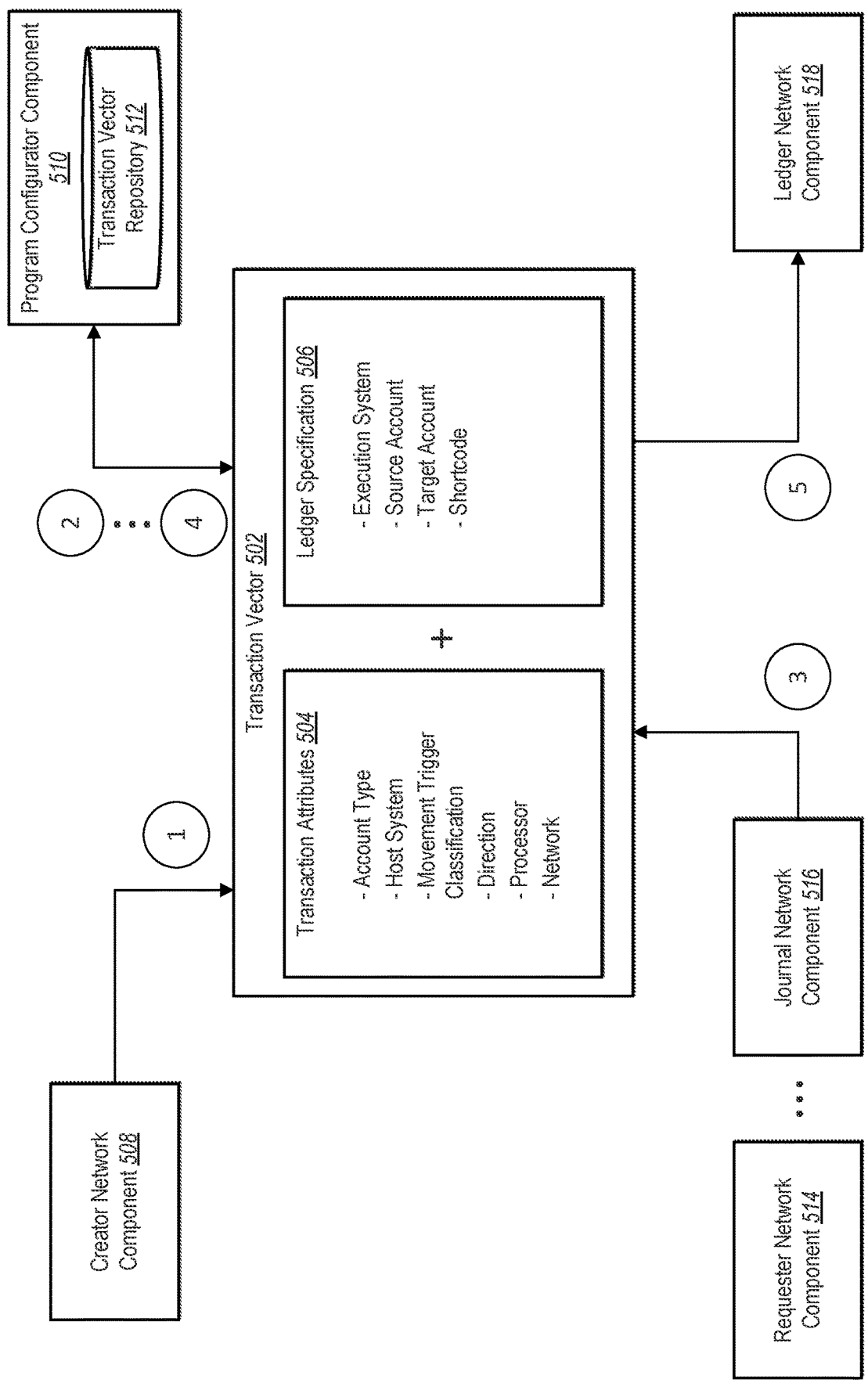
FIG. 5 illustrates an example transaction vector and a corresponding set of network components in accordance with one or more embodiments.

As mentioned above, in certain embodiments, the vector configurator system 106 can utilize a transaction vector and one or more network components to facilitate execution of a network transaction. In particular, the vector configurator system 106 can move assets among user accounts by implementing a unique data construct, the transaction vector, that is consistent across network transactions and can do so using a consistent pipeline of network components. FIG. 5 illustrates an example diagram of network components and their interactions with a transaction vector for facilitating processing of asset movement in accordance with one or more embodiments.

As illustrated in FIG. 5, the vector configurator system 106 utilizes a transaction vector 502 and a set of network components, including the creator network component 508, the program configurator network component 510, the requester network component 514, the journal network component 516, and the ledger network component 518 to facilitate execution of a transaction request. Indeed, the creator network component 508 refers to a network component that creates a transaction vector for storing within the transaction vector repository 512. For example, the creator network component 508 communicates with administrator device(s) 116 to generate a transaction vector and further communicates with the program configurator component 510 to store the transaction vector within the transaction vector repository 512. In some cases, the creator network component 508 generates a transaction vector using a particular computer code or instruction, according to the following pseudo code:
CreateTransactionVector(TransactionVector)
where the TransactionVector construct is defined below.

In addition, the requester network component 514 refers to a network component that generates and provides a transaction request. For example, the requester network component 514 communicates with client device(s) 118 and/or third party processing server(s) 112 to receive instructions (e.g., client device interactions) for a transaction request. In turn, the requester network component 514 generates a digital payload defining the transaction request in a format usable by other network components. Indeed, the requester network component communicates with a transaction network component to provide the digital payload of the transaction request.

The transaction network component, as described above, further processes the transaction request digital payload to extract transaction attributes and perform a preliminary request validation. In addition, the transaction network component communicates with the journal network component 516 to provide the extracted set of transaction attributes. The journal network component 516, in turn, communicates with the program configurator component 510 to compare the extracted attributes with stored sets of attributes for stored transaction vectors (e.g., by comparing key-value pairs). Based on the comparison, and based on whether a vector with a matching set of attributes is stored in the transaction vector repository 512, the journal network component 516 rejects or validates the transaction request. For example, the journal network component 516 performs a call to check if a stored vector exists and is enabled for the request, as given by the following pseudo code:
GetTransactionVector(KeyAttributes)=>TransactionVector
where the TransactionVector and KeyAttributes constructs are defined below. Indeed, the vector query (e.g., the vector query 424) from the journal network component 516 can have the following form:

```
GetTransactionVector(KeyAttributes{
    account_type: checking
    host_system: stride
    direction: debit
    movement_classification: card_purchase
    network: visa_net
    processor: visa_dps
}).
```

Based on validating a request, the journal network component 516 retrieves or accesses the stored transaction vector that corresponds to the extracted attributes. For instance, the program configurator component 510 returns a transaction vector the journal network component 516 based on the vector query. In some cases, the transaction vector has a particular format or structure, as given by the following pseudo code:

```
TransactionVector {
    KeyAttributes {...}
    LedgerSpecification {
        settled_by: visa_dps
        from_account: stride_card_activity
        to_account: stride_visa_settlement
        shortcode: "visa_dps_stride_activity_to_settlement"//visa stride card purchase
    }
    enabled: true
}
``` where the TransactionVector, KeyAttributes, and LedgerSpecification are defined below.

In addition, the journal network component 516 provides the transaction vector to the ledger network component 518. For example, the journal network component 516 publishes the transaction vector within a transaction event of an event stream that is broadcast to, or receivable by, the ledger network component 518. The ledger network component 518 further retrieves or receives the transaction event/vector and facilitates execution of asset movement according to the ledger specification within the vector. For instance, the ledger network component 518 communicates with other network components and/or third party processing server(s) 112 to move assets as dictated by the ledger specification.

FIG. 5 further illustrates, according to some embodiments, a sequence in which the network components interact with the transaction vector 502, as indicated by the circled numbers within the figure. For instance, the creator network component 508 first generates the transaction vector 502, and the program configurator component 510 receives the transaction vector 502 and stores it in the transaction vector repository 512. Thereafter, the journal network component 516 provides transaction attributes to the program configurator component 510 to identify the transaction vector 502 as a vector corresponding to a transaction request received from the requester network component 514, whereupon the program configurator component 510 provides the transaction vector 502 to the journal network component 516. Finally, the ledger network component 518 receives the transaction vector 502 (e.g., from the journal network component 516) to execute a corresponding network transaction.

As shown, and as described above, the transaction vector 502 includes a set of transaction attributes 504 and a ledger specification 506. Indeed, the vector configurator system 106 generates (via the creator network component 508 corresponding to administrator device(s) 118 or third party processing server(s) 112) the transaction vector 502 to define attributes for a valid asset movement and to further define how to move the assets. As shown, the transaction attributes 504 include an account type. In particular, the account type indicates or refers to a particular type or configuration for a digital account associated (e.g., that initiates) a network transaction. For example, the vector configurator system 106 determines a configuration for an account type by detecting a particular card used to initiate a transaction, determining a network-based product (e.g., the product 402) attached to or affiliated with the card within the inter-network facilitation system 104 (e.g., a STRIDE checking white card), and extracting the configuration of the account type from the network-based product.

As further shown in FIG. 5, the transaction attributes 504 include a host system. In particular, the host system indicates or refers to a financial network system that hosts or manages the digital account associated with a network transaction. For example, the vector configurator system 106 can determine a host system as a banking system that hosts or maintains the digital account based on detecting a particular card of the digital account (e.g., the card used to initiate the transaction) tied to a network-based product that specifies the host system. Additionally, the transaction attributes 504 include a movement trigger classification. In particular, the movement trigger classification indicates or refers to a category or classification of asset movement. For example, a movement trigger classification can indicate (e.g., as indicated in the ISO20022) a motivation or reason for moving assets among digital accounts, including a card purchase, a check deposit, a withdrawal, or some other instigating/triggering event (as described above).

Further, the transaction attributes 504 include a direction. In particular, the direction indicates or refers to a direction of asset movement relative to the digital account (e.g., as indicated in the ISO20022). For example, the vector configurator system 106 determines a direction as positive (e.g., a credit or a deposit for assets moving into the account) or negative (e.g., a debit or a withdrawal for assets moving out from the account). In addition, the transaction attributes 504 include a processor. In particular, the processor indicates or refers to a financial transaction processing system, such as VISADPS for card transactions or FINPLAT for ACH transactions). Further, the transaction attributes 504 include a network (e.g., as indicated in the ISO20022). In particular, the network indicates or refers to a network of servers or processors over which a transaction is processed. For example, the vector configurator system 106 can determine a network, such as VISA, INTERLINK, MAESTRO, ACH, or TABAPAY.

In one or more embodiments, the vector configurator system 106 generates and utilizes the transaction attributes 504 as defined by computer code. For example, the vector configurator system 106 can define the transaction attributes 504 according to the following pseudo code:

```
type KeyAttributes struct {
    account_type
    host_system
    direction
    movement_classification
    network
    processor
}.
```

As further illustrated in FIG. 5, the transaction vector 502 includes a ledger specification 506. More specifically, the ledger specification 506 includes a set of computer parameters or instructions that define how to process asset movement for a network transaction. For example, the ledger specification 506 includes an execution system. In particular, the execution system indicates or refers to a system of servers or processors responsible for settling a transaction. For instance, the vector configurator system 106 determines an execution system, such as VISADPS, FINPLAT, or TABAPAY as a system for executing or settling a transaction by moving assets.

As shown, the ledger specification 506 includes a source account and a target account. In particular, a source account indicates or refers to an omnibus account (within the inter-network facilitation system 104 or associated with third party processing server(s) 112) from which assets will be moved as part of a transaction. Additionally, a target account indicates or refers to an omnibus account (within the inter-network facilitation system 104 or associated with third party processing server(s) 112) into which assets will be moved as part of a transaction. In addition, the ledger specification 506 includes a shortcode. More specifically, the shortcode indicates or refers to (an abbreviated version of) computer code that represents a transaction vector (including the transaction attributes and the ledger specification) and that is consumable by one or more network components or systems to trigger execution of a network transaction according to the transaction vector.

In one or more embodiments, the vector configurator system 106 generates and utilizes the ledger specification 506 as defined by computer code. For example, the vector configurator system 106 can define the ledger specification 506 according to the following pseudo code:

```
type LedgerSpecification struct {
    settled_by
    from_account
    to_account
    shortcode
}.
```

In one or more embodiments, the transaction vector 502 also includes a clearing specification. For example, the clearing specification includes a set of instructions or computer code for how to move assets specific to System of Record ("SoR") systems. Indeed, a clearing specification can include computer code tailored for SoR systems that specifies how the systems should move funds related to a transaction.

In certain embodiments, vector configurator system 106 generates and utilizes the transaction vector 502 as defined by computer code. For example, the vector configurator system 106 can define the transaction vector 502 according to the following pseudo code:

```
type TransactionVector struct {
    KeyAttributes
    LedgerSpecification
    enabled
}.
```

Figure 6:
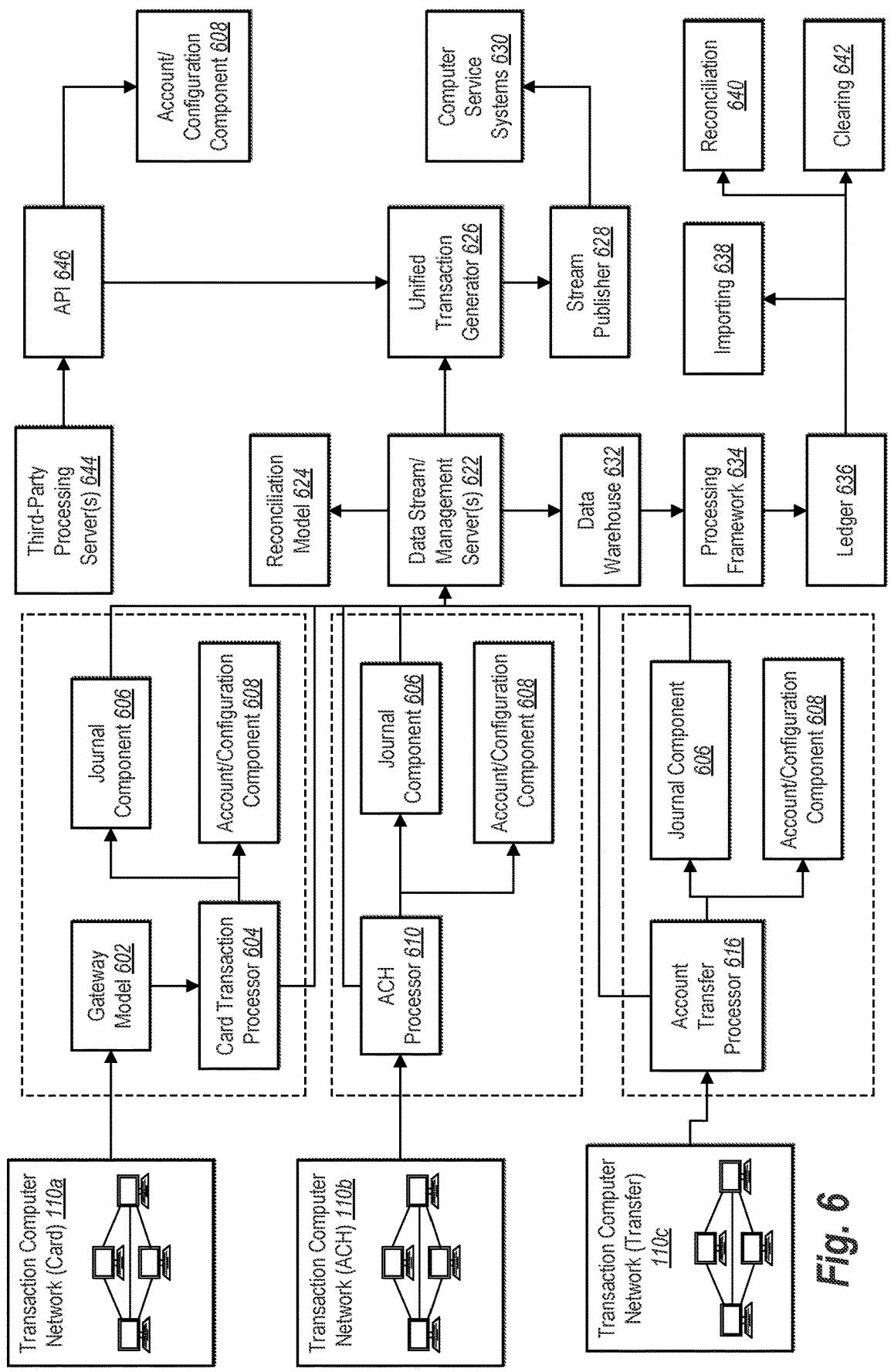
FIG. 6 illustrates an example schematic diagram of a computer platform for implementing a vector configurator system in accordance with one or more embodiments

As mentioned above, in certain described embodiments, the vector configurator system 106 utilizes various network components as part of a processing platform within the inter-network facilitation system 104. For example, FIG. 6 illustrates a platform in which the vector configurator system 106 operates in accordance with one or more embodiments. Indeed, FIG. 6 illustrates the transaction computer networks 110a-110c providing transaction information corresponding to different transaction types (e.g., card, ACH, or transfer transactions). The inter-network facilitation system 104 receives and processes this transaction information utilizing a variety of computer implemented models and procedures.

For example, as shown in FIG. 6, the inter-network facilitation system 104 utilizes a gateway model 602 to analyze transaction information from the transaction computer network 110a (e.g., a card transaction computer network). The gateway model 602 performs an initial analysis of the transaction information (e.g., accepts or rejects the transaction based on gateway criteria). Moreover, the inter-network facilitation system 104 also analyzes the transaction information utilizing the card transaction processor 604. In one or more embodiments, the card transaction processor 604 extracts and analyzes information for the inter-network facilitation system 104. For example, in some embodiments, the card transaction processor 604 transforms and converts information from the transaction computer network 110a for further analysis within the inter-network facilitation system 104. In some embodiments, the card transaction processor 604 assists in converting a network schema to a unified transaction schema, as described above (e.g., utilizing a unified transaction model).

As shown, the card transaction processor 604 also communicates with a journal component and an account/configuration component 608. For example, the account/configuration component 608 can verify that the inter-network facilitation system 104 has an account corresponding to the transaction information, whether the account has funds for the transaction, etc. Moreover, the account/configuration component 608 can determine account configurations corresponding to the transaction, as described above. The journal component 606 tracks and manages asset movement for a transaction. For example, the journal component 606 records asset movement for accounts corresponding to transactions.

As shown, the journal component 606 and/or the card transaction processor 604 emit transaction information, such as events, to data management server(s) 622. The data management server(s) 622 can store, process, provide, and/or report transaction information. For example, as illustrated, the data management server(s) 622 can provide transaction information to a reconciliation model 624 (e.g., to reconcile transaction information with the transaction computer network 110a). Similarly, the data management server(s) 622 can provide transaction information to a data warehouse 632 for further processing (via the processing framework 634) entry into a ledger 636 (or system of record), and further analysis via importing 638 (e.g., bank/entity importing), reconciliation 640 (e.g., reconciliation of the ledger or system of record), or clearing 642 processes/models. Indeed, in one or more embodiments, the journal component 606 exports transaction information (via the data management server(s) 622, and the data warehouse 632) to maintain a system of record for transactions across the inter-network facilitation system 104.

The inter-network facilitation system 104 performs similar functions with regard to the transaction computer networks 110b, 110c (e.g., ACH transaction computer networks and transfer transaction computer networks). As shown, the inter-network facilitation system 104 utilizes an ACH processor 610 to process transaction information from the transaction computer network 110b (e.g., similar to the card transaction processor 604). Moreover, the inter-network facilitation system 104 utilizes the journal component 606 and the account/configuration component 608 to transmit transaction events to the data management server(s) 622. Similarly, the inter-network facilitation system 104 utilizes an account transfer processor 616 to process transaction information from the transaction computer network 110c (e.g., similar to the card transaction processor 604). Moreover, the inter-network facilitation system 104 utilizes the journal component 606 and the account/configuration component 608 to transfer transaction events corresponding to the transaction computer network 110c to the data management server(s) 622.

As shown in FIG. 6, the inter-network facilitation system 104 utilizes a unified transaction generator 626 (e.g., the unified transaction model of the vector configurator system 106) to generate unified transaction containers for individual transactions. As shown, the unified transaction generator 626 can combine transaction information from different transaction computer networks 110a-110c. As shown, the unified transaction generator 626 can also generate unified transaction containers from transaction information received from third-party processing server(s) 644.

For example, the third-party processing server(s) 644 can work in conjunction with the inter-network facilitation system 104 to provide additional bandwidth, throughput, or redundancy in processing transactions from the transaction computer networks 110a-110c. In some implementations, the third-party processing server(s) 644 receive and process transaction information. The inter-network facilitation system 104 can utilize an API 646 to import the transaction information (and utilize the account/configuration component 608 to verify account information and obtain account configurations to feed the transaction information through the remainder of the inter-network facilitation system 104). The unified transaction generator 626 receives this transaction information and generates unified transaction containers (e.g., by converting the transaction information, if necessary, and populating unified transaction containers with pertinent information extracted from the transaction information).

Moreover, the inter-network facilitation system 104 publishes a unified transaction stream utilizing a stream publisher 628. As show, the stream publisher 628 provides the unified transaction stream to computer service systems 630. Thus, the unified transaction stream can include information from the transaction computer networks 110*a*-110*c* and information from the third-party processing server(s) 644.

The components of the vector configurator system 106 can include software, hardware, or both. For example, the components of the vector configurator system 106 can include one or more instructions stored on a computer-readable storage medium and executable by processors of one or more computing devices (e.g., the server device(s) 102, the client device(s) 118, the administrator device(s) 116, and/or the transaction computer network device(s) 110*a*-110*c*). When executed by the one or more processors, the computer-executable instructions of the vector configurator system 106 can cause a computing device to perform the methods described herein. Alternatively, the components of the vector configurator system 106 can comprise hardware, such as a special purpose processing device to perform a certain function or group of functions. Additionally or alternatively, the components of the vector configurator system 106 can include a combination of computer-executable instructions and hardware.

Furthermore, the components of the vector configurator system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the vector configurator system 106 may be implemented as part of a stand-alone application on a personal computing device or a mobile device. Alternatively or additionally, the components of the vector configurator system 106 may be implemented in any application that allows creation and delivery of financial and/or marketing content to users, including, but not limited to, various applications.

FIGS. 1-6, the corresponding text, and the examples provide a number of different systems, methods, and non-transitory computer readable media for generating and utilizing transaction vectors for facilitating asset movement of an inter-network facilitation system. In addition to the foregoing, embodiments can also be described in terms of flowcharts comprising acts for accomplishing a particular result. For example, FIG. 7 illustrates a flowchart of an example sequence of acts in accordance with one or more embodiments.

Figure 7:
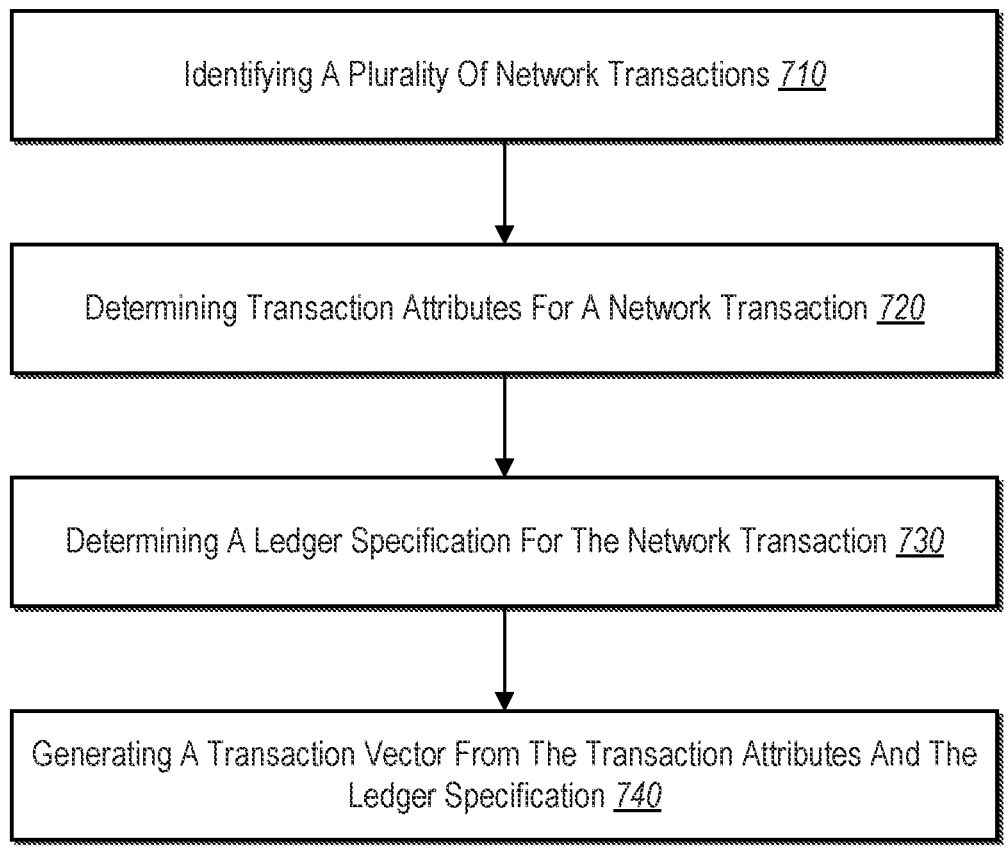
FIG. 7 illustrates an example series of acts for generating and utilizing a transaction vector in accordance with one or more embodiments.

While FIG. 7 illustrates acts according to some embodiments, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7. Additionally, the acts described herein may be repeated or performed in parallel with one another or in parallel with different instances of the same or other similar acts.

FIG. 7 illustrates an example series of acts 700 for generating and utilizing transaction vectors for facilitating asset movement of an inter-network facilitation system. The series of acts 700 can include acts 710-740. The act 710 can involve identifying a plurality of network transactions. The act 720 can involve determining transaction attributes for a network transaction. The act 730 can involve determining a ledger specification for the network transaction. The act 740 can involve generating a transaction vector from the transaction attributes and the ledger specification.

In one or more embodiments, the series of acts 700 includes an act of identifying a plurality of network transactions for transferring assets using network components of an inter-network facilitation system. In the same or other embodiments, the series of acts 700 includes an act of determining, for a network transaction within the plurality of network transactions, transaction attributes defining an account type for a user account associated with the network transaction and further defining a movement trigger classification indicating a reason for the network transaction. In these or other embodiments, the series of acts 700 includes an act of determining, for the network transaction, a ledger specification defining computer code for executing the network transaction between a source account and a target account using a ledger network component. The series of acts 700 can also include an act of generating, for storage within a transaction vector repository of the inter-network facilitation system, a transaction vector defining the network transaction as executable by the inter-network facilitation system by combining the transaction attributes and the ledger specification.

In certain embodiments, the series of acts 700 includes an act of receiving a transaction request for transferring assets among digital accounts of the inter-network facilitation system. In addition, the series of acts 700 can include an act of, based on receiving the transaction request, extracting a set of transaction attributes from the transaction request indicating an account type for a user account associated with the transaction request and further indicating a movement trigger classification for the transaction request. The series of acts 700 can further include an act of verifying, based on the set of transaction attributes extracted from the transaction request, that the transaction request corresponds to the transaction vector defining the network transaction within the transaction vector repository.

In some cases, the series of acts 700 includes an act of publishing the transaction vector to an event stream according to the ledger specification based on verifying that the transaction request corresponds to the transaction vector. The series of acts 700 can also include an act of verifying that the transaction request corresponds to the transaction vector by comparing the set of transaction attributes extracted from the transaction request with the transaction attributes associated with the network transaction stored within the transaction vector repository. In addition, the series of acts 700 can include an act of determining, based on verifying that the transaction request corresponds to the transaction vector, computer code for executing the transaction request between the source account and the target account according to the ledger specification.

In one or more embodiments, the series of acts 700 can include an act of extracting the set of transaction attributes from the transaction request utilizing a transaction network component. Further, the series of acts 700 can include an act of verifying that the transaction request corresponds to the transaction vector utilizing a journal network component. The series of acts 700 can also include acts of receiving a transaction request for transferring assets among digital accounts of the inter-network facilitation system, extracting a set of transaction attributes from the transaction request indicating an account type and a movement trigger classification for the transaction request, comparing the set of transaction attributes from the transaction request with transaction attributes of stored transaction vectors within the transaction vector repository, and rejecting the transaction request based on comparing the set of transaction attributes from the transaction request with the transaction attributes of stored transaction vectors.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
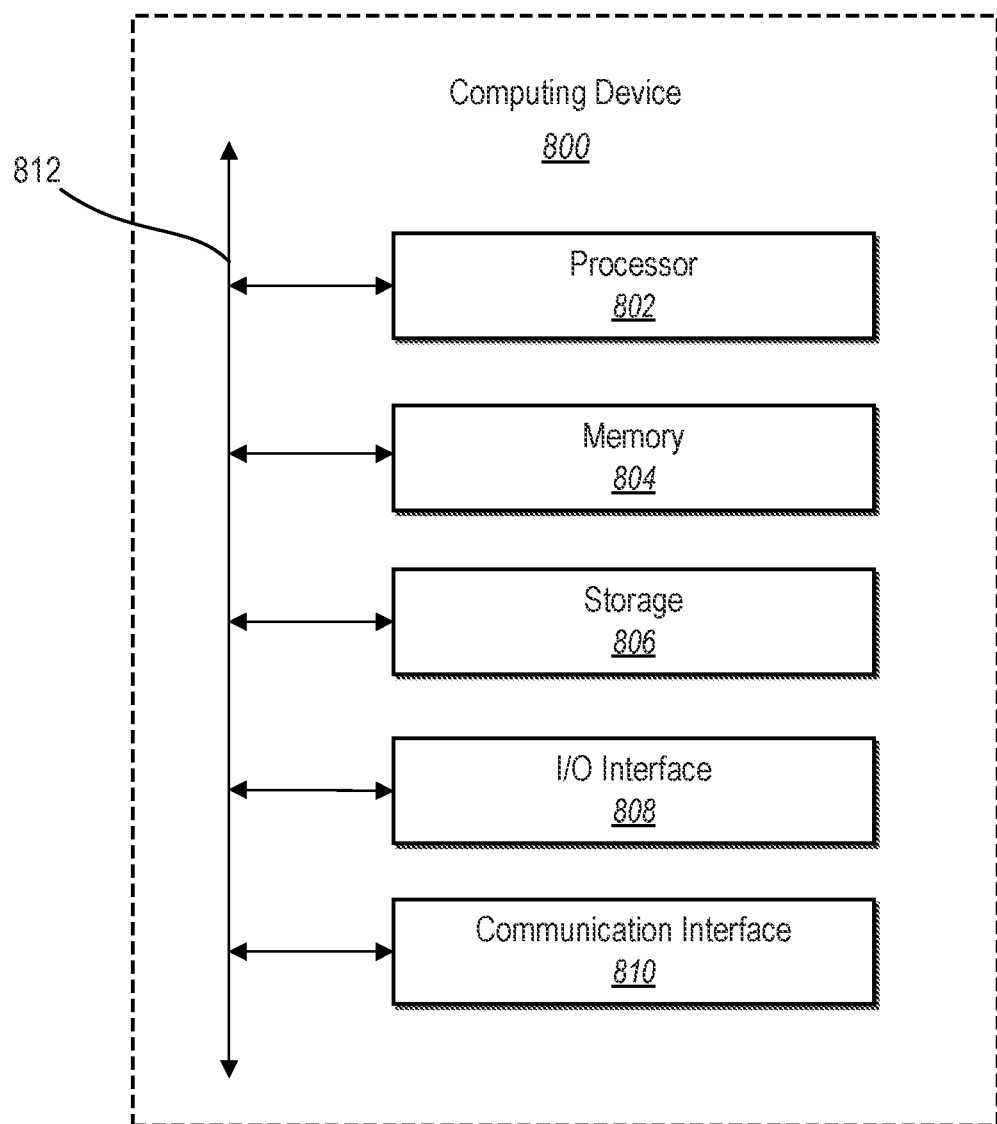
FIG. 8 illustrates a block diagram of a computing device for implementing one or more embodiments of the present disclosure.

FIG. 8 illustrates, in block diagram form, an exemplary computing device 800 (e.g., the client device(s) 118, the administrator device(s) 116, the transaction computer network devices 110a-110c, or the server device(s) 102) that may be configured to perform one or more of the processes described above. As shown by FIG. 8, the computing device can comprise a processor 802, memory 804, a storage device 806, an I/O interface 808, and a communication interface 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, storage device 806 can comprise a non-transitory storage medium described above. The storage device 806 may include a hard disk drive ("HDD"), flash memory, a Universal Serial Bus ("USB") drive or a combination of these or other storage devices.

The computing device 800 also includes one or more input or output interface 808 (or "I/O interface 808"), which are provided to allow a user (e.g., requester or provider) to provide input to (such as user strokes), receive output from, and otherwise transfer data to and from the computing device 800. These I/O interface 808 may include a mouse, keypad or a keyboard, a touch screen, camera, optical scanner, network interface, modem, other known I/O devices or a combination of such I/O interface 808. The touch screen may be activated with a stylus or a finger.

The I/O interface 808 may include one or more devices for presenting output to a user, including, but not limited to, a graphics engine, a display (e.g., a display screen), one or more output providers (e.g., display providers), one or more audio speakers, and one or more audio providers. In certain embodiments, interface 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller ("NIC") or network adapter for communicating with an Ethernet or other wire-based network or a wireless NIC ("WNIC") or wireless adapter for communicating with a wireless network, such as a WI-FI. The computing device 800 can further include a bus 812. The bus 812 can comprise hardware, software, or both that connects components of computing device 800 to each other.

Figure 9:
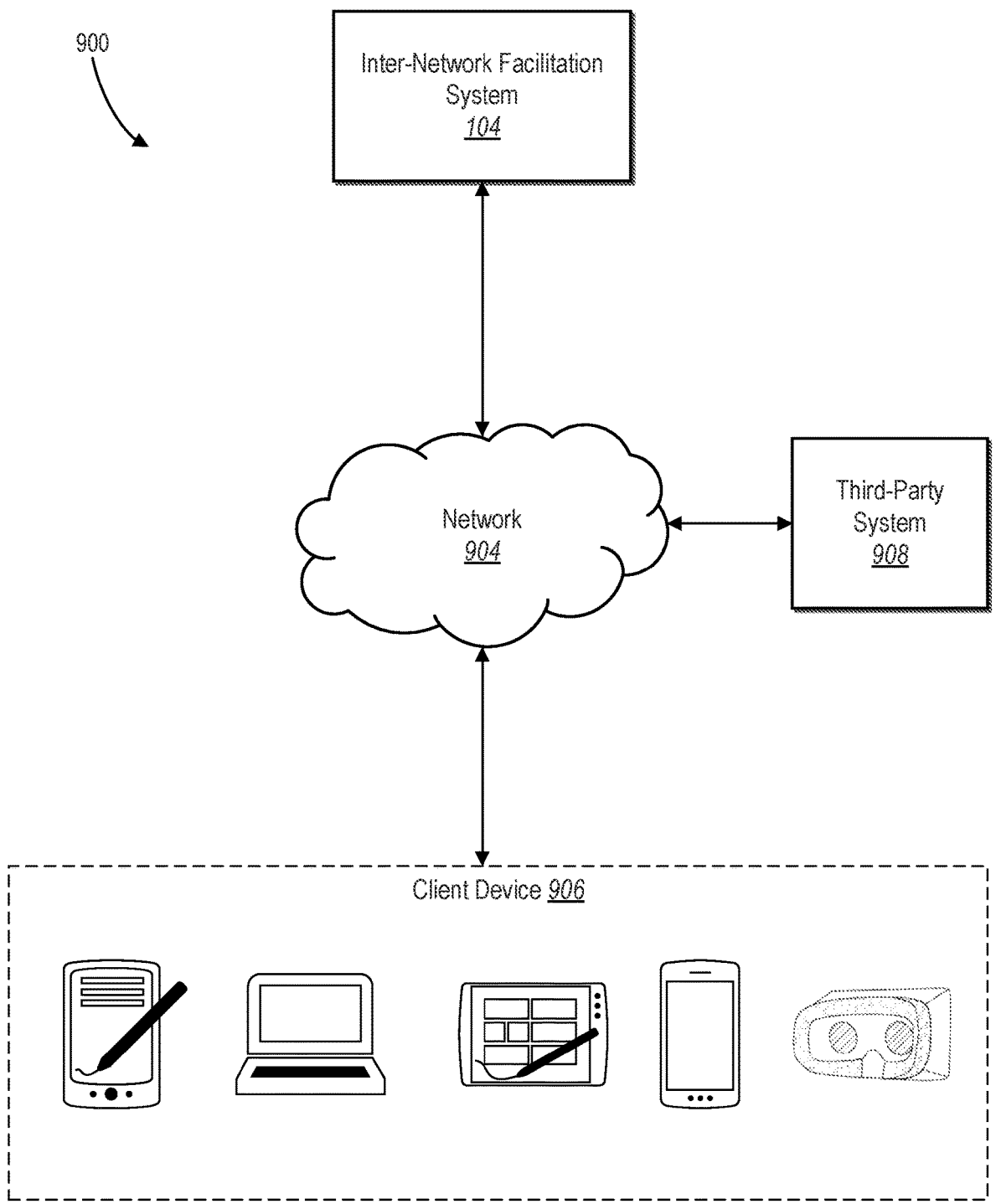
FIG. 9 illustrates an example environment for an inter-network facilitation system in accordance with one or more embodiments.

FIG. 9 illustrates an example network environment 900 of the inter-network facilitation system 104. The network environment 900 includes a client device 906 (e.g., the client device 118, administrator device(s) 116, and/or the transaction computer network device(s) 110a-110c), an inter-network facilitation system 104, and a third-party system 908 (e.g., the third-party processing server(s) 112) connected to each other by a network 904. Although FIG. 9 illustrates a particular arrangement of the client device 906, the inter-network facilitation system 104, the third-party system 908, and the network 904, this disclosure contemplates any suitable arrangement of client device 906, the inter-network facilitation system 104, the third-party system 908, and the network 904. As an example, and not by way of limitation, two or more of client device 906, the inter-network facilitation system 104, and the third-party system 908 communicate directly, bypassing network 904. As another example, two or more of client device 906, the inter-network facilitation system 104, and the third-party system 908 may be physically or logically co-located with each other in whole or in part.

Moreover, although FIG. 9 illustrates a particular number of client devices 906, inter-network facilitation systems 104, third-party systems 908, and networks 904, this disclosure contemplates any suitable number of client devices 906, inter-network facilitation system 104, third-party systems 908, and networks 904. As an example, and not by way of limitation, network environment 900 may include multiple client devices 906, inter-network facilitation system 104, third-party systems 908, and/or networks 904.

This disclosure contemplates any suitable network 904. As an example, and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, the inter-network facilitation system 104 (which hosts the vector configurator system 106), and third-party system 908 to network 904 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by client device 906. As an example, and not by way of limitation, a client device 906 may include any of the computing devices discussed above in relation to FIG. 8. A client device 906 may enable a network user at the client device 906 to access network 904. A client device 906 may enable its user to communicate with other users at other client devices 906.

In particular embodiments, the client device 906 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 906 one or more Hyper Text Markup Language ("HTML") files responsive to the HTTP request. The client device 906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 904) to link the third-party system 908. For example, the inter-network facilitation system 104 may receive authentication credentials from a user to link a third-party system 908 such as an online banking system to link an online bank account, credit account, debit account, or other financial account to a user profile within the inter-network facilitation system 104. The inter-network facilitation system 104 can subsequently communicate with the third-party system 908 to detect or identify balances, transactions, withdrawal, transfers, deposits, credits, debits, or other transaction types associated with the third-party system 908. The inter-network facilitation system 104 can further provide the aforementioned or other financial information associated with the third-party system 908 for display via the client device 906. In some cases, the inter-network facilitation system 104 links more than one third-party system 908, receiving account information for accounts associated with each respective third-party system 908 and performing operations or transactions between the different systems via authorized network connections.

In particular embodiments, the inter-network facilitation system 104 may interface between an online banking system and a credit processing system via the network 904. For example, the inter-network facilitation system 104 can provide access to a bank account of a third-party system 908 and linked to a user profile within the inter-network facilitation system 104. Indeed, the inter-network facilitation system 104 can facilitate access to, and transactions to and from, the bank account of the third-party system 908 via a client application of the inter-network facilitation system 104 on the client device 906. The inter-network facilitation system 104 can also communicate with a credit processing system, an ATM system, and/or other financial systems (e.g., via the network 904) to authorize and process credit charges to a credit account, perform ATM transactions, perform transfers (or other transactions) between user profiles or across accounts of different third-party systems 908, and to present corresponding information via the client device 906.

In particular embodiments, the inter-network facilitation system 104 includes a model (e.g., a machine learning model) for approving or denying transactions. For example, the inter-network facilitation system 104 includes a transaction approval machine learning model that is trained based on training data such as user profile information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 908), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 900 either directly or via network 904. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 904.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 906. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 906 associated with users.

In addition, the third-party system 908 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 904. A third-party system 908 can communicate with the inter-network facilitation system 104 to provide financial information pertaining to balances, transactions, and other information, whereupon the inter-network facilitation system 104 can provide corresponding information for display via the client device 906. In particular embodiments, a third-party system 908 communicates with the inter-network facilitation system 104 to update account balances, transaction histories, credit usage, and other internal information of the inter-network facilitation system 104 and/or the third-party system 908 based on user interaction with the inter-network facilitation system 104 (e.g., via the client device 906). Indeed, the inter-network facilitation system 104 can synchronize information across one or more third-party systems 908 to reflect accurate account information (e.g., balances, transactions, etc.) across one or more networked systems, including instances where a transaction (e.g., a transfer) from one third-party system 908 affects another third-party system 908.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
a universal network component pipeline adaptable across network transactions, the universal network component pipeline including a transaction vector repository, a creator network component operated by a first processor, a creator network component operated by a second processor, and a program configurator component operated by a third processor, and a ledger network component operated by a fourth processor; and
a non-transitory computer readable medium comprising instructions that, when executed by one or more of the first processor, the second processor, the third processor, or the fourth processor, cause the system to:
identify a plurality of network transactions for transferring assets using network components of the universal network component pipeline executed by respective server-based processors communicatively coupled to form a networking environment of an inter-network facilitation system;
determine, using the first processor of the creator network component within the universal network component pipeline to process a network transaction within the plurality of network transactions, transaction attributes defining an account type for a user account associated with the network transaction and further defining a movement trigger classification indicating a reason for the network transaction;
determine, using the first processor of the creator network component to process the network transaction, a ledger specification defining computer code for executing the network transaction between a source account and a target account using the ledger network component;

generate, for storage within the transaction vector repository using the second processor of the creator network component within the universal network component pipeline, a transaction vector defining the network transaction as executable by the inter-network facilitation system by combining the transaction attributes and the ledger specification, wherein the transaction vector comprises a universal set of transaction attributes adaptable across the plurality of network transactions and compatible across the network components of the universal network component pipeline;

store, using the third processor of the program configurator component within the universal network component pipeline, the transaction vector within the transaction vector repository that stores a plurality of transaction vectors defining transaction attributes referenced by multiple network transactions; and determine, for the network transaction using the fourth processor of the ledger network component within the universal network component pipeline, asset movement defined by the ledger specification of the transaction vector.

2. The system of claim 1, further comprising instructions that, when executed by one or more of the first processor, the second processor, the third processor, or the fourth processor, cause the system to:

receive a transaction request for transferring assets among digital accounts of the inter-network facilitation system;

based on receiving the transaction request, extract a set of transaction attributes from the transaction request indicating an account type for a user account associated with the transaction request and further indicating a movement trigger classification for the transaction request; and verify, based on the set of transaction attributes extracted from the transaction request, that the transaction request corresponds to the transaction vector defining the network transaction within the transaction vector repository.

3. The system of claim 2, further comprising instructions that, when executed by one or more of the first processor, the second processor, the third processor, or the fourth processor, cause the system to publish the transaction vector to an event stream according to the ledger specification based on verifying that the transaction request corresponds to the transaction vector.

4. The system of claim 2, further comprising instructions that, when executed by one or more of the first processor, the second processor, the third processor, or the fourth processor, cause the system to verify that the transaction request corresponds to the transaction vector by comparing the set of transaction attributes extracted from the transaction request with the transaction attributes associated with the network transaction stored within the transaction vector repository.

5. The system of claim 2, further comprising instructions that, when executed by one or more of the first processor, the second processor, the third processor, or the fourth processor, cause the system to determine, based on verifying that the transaction request corresponds to the transaction vector, computer code for executing the transaction request between the source account and the target account according to the ledger specification.

6. The system of claim 2, further comprising instructions that, when executed by one or more of the first processor, the second processor, the third processor, or the fourth processor, cause the system to:

extract the set of transaction attributes from the transaction request utilizing a transaction network component; and verify that the transaction request corresponds to the transaction vector utilizing a journal network component.

7. The system of claim 1, further comprising instructions that, when executed by one or more of the first processor, the second processor, the third processor, or the fourth processor, cause the system to:

receive a transaction request for transferring assets among digital accounts of the inter-network facilitation system;

extract a set of transaction attributes from the transaction request indicating an account type and a movement trigger classification for the transaction request;

compare the set of transaction attributes from the transaction request with transaction attributes of stored transaction vectors within the transaction vector repository; and reject the transaction request based on comparing the set of transaction attributes from the transaction request with the transaction attributes of stored transaction vectors.

8. A method comprising:

identifying a plurality of network transactions for transferring assets using network components of a universal network component pipeline executed by respective server-based processors communicatively coupled to form a networking environment of an inter-network facilitation system, wherein the universal network component pipeline comprises a transaction vector repository, a creator network component operated by a first processor, a creator network component operated by a second processor, and a program configurator component operated by a third processor, and a ledger network component operated by a fourth processor;

determining, using the first processor of the creator network component within the universal network component pipeline to process a network transaction within the plurality of network transactions, transaction attributes defining an account type for a user account associated with the network transaction and further defining a movement trigger classification indicating a reason for the network transaction;

determining, using the first processor of the creator network component to process the network transaction, a ledger specification defining computer code for executing the network transaction between a source account and a target account using the ledger network component;

generating, for storage within the transaction vector repository using the second processor of the creator network component within the universal network component pipeline of the inter-network facilitation system, a transaction vector defining the network transaction as executable by the inter-network facilitation system by combining the transaction attributes and the ledger specification, wherein the transaction vector comprises a universal set of transaction attributes adaptable across the plurality of network transactions and compatible across the network components of the universal network component pipeline;

storing, using the third processor of the program configurator component within the universal network component pipeline, the transaction vector within the transaction vector repository that stores a plurality of transaction vectors defining transaction attributes referenced by multiple network transactions; and determining, for the network transaction using the fourth processor of the ledger network component within the universal network component pipeline, asset movement defined by the ledger specification of the transaction vector.

9. The method of claim 8, further comprising:
receiving a transaction request for transferring assets among digital accounts of the inter-network facilitation system;
based on receiving the transaction request, extracting a set of transaction attributes from the transaction request indicating an account type for a user account associated with the transaction request and further indicating a movement trigger classification for the transaction request; and
verifying, based on the set of transaction attributes extracted from the transaction request, that the transaction request corresponds to the transaction vector defining the network transaction within the transaction vector repository.

10. The method of claim 9, further comprising publishing the transaction vector to an event stream according to the ledger specification based on verifying that the transaction request corresponds to the transaction vector.

11. The method of claim 9, further comprising verifying that the transaction request corresponds to the transaction vector by comparing the set of transaction attributes extracted from the transaction request with the transaction attributes associated with the network transaction stored within the transaction vector repository.

12. The method of claim 9, further comprising determining, based on verifying that the transaction request corresponds to the transaction vector, computer code for executing the transaction request between the source account and the target account according to the ledger specification.

13. The method of claim 9, further comprising:
extracting the set of transaction attributes from the transaction request utilizing a transaction network component; and
verifying that the transaction request corresponds to the transaction vector utilizing a journal network component.

14. The method of claim 8, further comprising:
receiving a transaction request for transferring assets among digital accounts of the inter-network facilitation system;
extracting a set of transaction attributes from the transaction request indicating an account type and a movement trigger classification for the transaction request;
comparing the set of transaction attributes from the transaction request with transaction attributes of stored transaction vectors within the transaction vector repository; and
rejecting the transaction request based on comparing the set of transaction attributes from the transaction request with the transaction attributes of stored transaction vectors.

15. A non-transitory computer readable medium comprising instructions that, when executed by at least one processor, cause a computing device to:
identify a plurality of network transactions for transferring assets using network components of a universal network component pipeline executed by respective server-based processors communicatively coupled to form a networking environment of an inter-network facilitation system, wherein the universal network component pipeline comprises a transaction vector repository, a creator network component operated by a first processor, a creator network component operated by a second processor, and a program configurator component operated by a third processor, and a ledger network component operated by a fourth processor, determine, using the first processor of the creator network component within the universal network component pipeline to process a network transaction within the plurality of network transactions, transaction attributes defining an account type for a user account associated with the network transaction and further defining a movement trigger classification indicating a reason for the network transaction;

determine, using the first processor of the creator network component to process the network transaction, a ledger specification defining computer code for executing the network transaction between a source account and a target account using the ledger network component; and generate, for storage within a transaction vector repository using the second processor of the creator network component within the universal network component pipeline of the inter-network facilitation system, a transaction vector defining the network transaction as executable by the inter-network facilitation system by combining the transaction attributes and the ledger specification, wherein the transaction vector comprises a universal set of transaction attributes adaptable across the plurality of network transactions and compatible across the network components of the universal network component pipeline;

store, using the third processor of the program configurator component within the universal network component pipeline, the transaction vector within the transaction vector repository that stores a plurality of transaction vectors defining transaction attributes referenced by multiple network transactions; and determine, for the network transaction using the fourth processor of the ledger network component within the universal network component pipeline, asset movement defined by the ledger specification of the transaction vector.

16. The non-transitory computer readable medium of claim 15, further comprising instructions that, when executed by the at least one processor, cause the computing device to:
receive a transaction request for transferring assets among digital accounts of the inter-network facilitation system;
based on receiving the transaction request, extract a set of transaction attributes from the transaction request indicating an account type for a user account associated with the transaction request and further indicating a movement trigger classification for the transaction request; and
verify, based on the set of transaction attributes extracted from the transaction request, that the transaction request corresponds to the transaction vector defining the network transaction within the transaction vector repository.

17. The non-transitory computer readable medium of claim 16, further comprising instructions that, when executed by the at least one processor, cause the computing device to publish the transaction vector to an event stream according to the ledger specification based on verifying that the transaction request corresponds to the transaction vector.

18. The non-transitory computer readable medium of claim 16, further comprising instructions that, when executed by the at least one processor, cause the computing device to verify that the transaction request corresponds to the transaction vector by comparing the set of transaction attributes extracted from the transaction request with the transaction attributes associated with the network transaction stored within the transaction vector repository.

19. The non-transitory computer readable medium of claim 16, further comprising instructions that, when executed by the at least one processor, cause the computing device to determine, based on verifying that the transaction request corresponds to the transaction vector, computer code for executing the transaction request between the source account and the target account according to the ledger specification.

20. The non-transitory computer readable medium of claim 16, further comprising instructions that, when executed by the at least one processor, cause the computing device to:
- extract the set of transaction attributes from the transaction request utilizing a transaction network component; and
- verify that the transaction request corresponds to the transaction vector utilizing a journal network component.

* * * * *